United States Patent
Kiyohara et al.

(10) Patent No.: US 12,548,826 B2
(45) Date of Patent: Feb. 10, 2026

(54) EXTERIOR MATERIAL FOR POWER STORAGE DEVICE, METHOD FOR MANUFACTURING SAME, AND POWER STORAGE DEVICE

(71) Applicant: DAI NIPPON PRINTING CO., LTD., Tokyo (JP)

(72) Inventors: Yoshiko Kiyohara, Tokyo (JP); Atsuko Takahagi, Tokyo (JP); Kazufumi Kodani, Tokyo (JP); Daisuke Yasuda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 515 days.

(21) Appl. No.: 18/026,931

(22) PCT Filed: Sep. 8, 2021

(86) PCT No.: PCT/JP2021/033041
§ 371 (c)(1),
(2) Date: Mar. 17, 2023

(87) PCT Pub. No.: WO2022/065036
PCT Pub. Date: Mar. 31, 2022

(65) Prior Publication Data
US 2023/0335835 A1   Oct. 19, 2023

(30) Foreign Application Priority Data
Sep. 25, 2020 (JP) .................... 2020-161027

(51) Int. Cl.
*H01M 50/121* (2021.01)
*H01M 50/124* (2021.01)
*H01M 50/129* (2021.01)

(52) U.S. Cl.
CPC ..... *H01M 50/121* (2021.01); *H01M 50/1243* (2021.01); *H01M 50/129* (2021.01)

(58) Field of Classification Search
CPC .......... H01M 50/121; H01M 50/1243; H01M 50/129
See application file for complete search history.

(56) References Cited

U.S. PATENT DOCUMENTS
2008/0286635 A1   11/2008   Seino et al.

FOREIGN PATENT DOCUMENTS

| JP | 2008-287971 A | 11/2008 |
| JP | 2018-88306 A | 6/2018 |
| JP | 2019-196470 A | 11/2019 |
| JP | 2020-37632 A | 3/2020 |
| WO | 2011/078554 A2 | 6/2011 |
| WO | 2017/209219 A1 | 12/2017 |

OTHER PUBLICATIONS

Nov. 2, 2021 Search Report issued in International Patent Application No. PCT/JP2021/033041.
Oct. 1, 29, 2024 Supplementary Search Report issued in European Patent Application No. 21872167.8.

*Primary Examiner* — Jane J Rhee
(74) *Attorney, Agent, or Firm* — Oliff PLC

(57) ABSTRACT

This exterior material for a power storage device is constituted of at least an outside layer, a barrier layer, and an inside layer, in that order from the outer side. The inside layer includes a compound represented by general formula (A). (In general formula (A), R11 and R12 each independently represent an alkyl group having 1 to 18 carbons, or a phenyl group that optionally has a substituent).

10 Claims, 3 Drawing Sheets

EXTERIOR MATERIAL FOR POWER STORAGE DEVICE, METHOD FOR MANUFACTURING SAME, AND POWER STORAGE DEVICE

TECHNICAL FIELD

The present disclosure relates to an exterior material for electrical storage devices, a method for manufacturing the exterior material for electrical storage devices, and an electrical storage device.

BACKGROUND ART

Various types of electrical storage devices have been developed heretofore, and in every electrical storage device, an exterior material is an essential member for sealing electrical storage device elements such as an electrode and an electrolyte. Metallic exterior materials have been often used heretofore as exterior materials for electrical storage devices.

On the other hand, in recent years, electrical storage devices have been required to be diversified in shape and to be thinned and lightened with improvement of performance of electric cars, hybrid electric cars, personal computers, cameras, mobile phones and so on. However, metallic exterior material for electrical storage devices that have often been heretofore used have the disadvantage that it is difficult to keep up with diversification in shape, and there is a limit on weight reduction.

Thus, heretofore a film-shaped laminate with a base material layer, a barrier layer, an adhesive layer and a heat-sealable resin layer laminated in this order has been proposed as an exterior material for electrical storage devices which is easily processed into diversified shapes and is capable of achieving thickness reduction and weight reduction (see, for example, Patent Document 1).

In such an exterior material for electrical storage devices, generally, a concave portion is formed by cold molding, electrical storage device elements such as an electrode and an electrolytic solution are disposed in a space formed by the concave portion, and heat-sealable resin layers are heat-sealed to obtain an electrical storage device with electrical storage device elements stored in the exterior material for electrical storage devices.

PRIOR ART DOCUMENT

Patent Document

Patent Document 1: Japanese Patent Laid-open Publication No. 2008-287971

SUMMARY OF THE INVENTION

Problems to be Solved by the Invention

In the manufacturing process of an exterior material for electrical storage devices, an inner layer is formed by, for example, a method in which a resin for forming the inner layer is melt-extruded onto a barrier layer, or a method in which a resin film for forming the inner layer is laminated by a dry lamination method using an adhesive. For the method in which a resin for forming an inner layer is melt-extruded onto a barrier layer, the inventors of the present disclosure have made an attempt to shorten a lead time by heating the resin for forming the inner layer to a higher temperature than before (e.g. 300° C. or higher) for further improving productivity of an exterior material for electrical storage devices (productivity of an electrical storage device). However, the inventors of the present disclosure face a new problem that if the temperature of the resin for forming the inner layer increases, the insulation quality of the resulting exterior material for electrical storage devices is deteriorated. Even for the method in which a resin film for forming an inner layer is laminated using an adhesive, the same problem may occur if during formation of the resin film, the film is heated to a high temperature to shorten the lead time.

Under these circumstances, a main object of the present disclosure is to provide an exterior material for electrical storage devices which includes a laminate including at least a base material layer, a barrier layer and an inner layer in this order from the outside and which exhibits excellent insulation quality even if a resin for forming the inner layer is melted at a high temperature to form the inner layer.

Means for Solving the Problem

The inventors of the present disclosure have extensively conducted studies for solving the above-described problems. As a result, it has been found that when in an exterior material for electrical storage devices which includes a laminate including at least a base material layer, a barrier layer and an inner layer in this order from the outside, a specific phosphorus-based antioxidant is blended in the inner layer, the exterior material for electrical storage devices exhibits excellent insulation quality even if a resin for forming the inner layer is melted at a high temperature to form the inner layer.

The present disclosure has been completed by further conducting studies based on the above-mentioned findings. That is, the present disclosure provides an invention of an aspect as described below.

An exterior material for electrical storage devices which includes a laminate including at least a base material layer, a barrier layer and an inner layer in this order from the outside, the inner layer containing a compound represented by the following general formula (A):

[Chemical Formula 1]

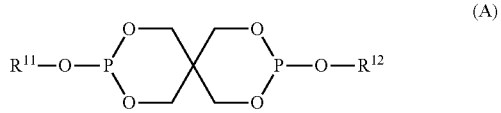

wherein $R^{11}$ and $R^{12}$ each independently represent an alkyl group having 1 to 18 carbon atoms, or a phenyl group optionally having a substituent.

Advantages of the Invention

According to the present disclosure, it is possible to provide an exterior material for electrical storage devices which includes a laminate including at least a base material layer, a barrier layer and an inner layer in this order from the outside and which exhibits excellent insulation quality even if a resin for forming the inner layer is melted at a high temperature (e.g. 300° C. or higher) to form the inner layer. In the exterior material for electrical storage devices according to the present disclosure, a resin for forming the inner layer can be heated to a higher temperature than before (e.g. 300° C. or higher) to form a film, so that the lead time is shortened to enhance productivity of the exterior material for electrical storage devices. According to the present disclosure, it is also possible to provide a method for manufacturing an exterior material for electrical storage devices, and an electrical storage device.

EMBODIMENTS OF THE INVENTION

An exterior material for electrical storage devices includes a laminate including at least a base material layer, a barrier layer and an inner layer in this order from the outside, and the inner layer contains a compound represented by the following general formula (A). The exterior material for electrical storage devices according to the present disclosure has such a configuration, so that a resin for forming the inner layer can be melted at a high temperature (e.g. 300° C. or higher) to form the inner layer, and excellent insulation quality is exhibited.

[Chemical Formula 2]

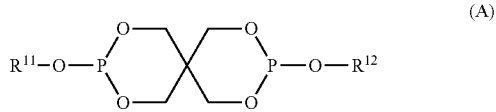

(A)

In general formula (A), $R^{11}$ and $R^{12}$ each independently represent an alkyl group having 1 to 18 carbon atoms, or a phenyl group optionally having a substituent.

Hereinafter, the exterior material for electrical storage devices according to the present disclosure will be described in detail. In the present disclosure, a numerical range indicated by the term "A to B" means "A or more" and "B or less". For example, the expression of "2 to 15 mm" means 2 mm or more and 15 mm or less.

1. Laminated Structure of Exterior Material for Electrical Storage Devices

Figure 1:
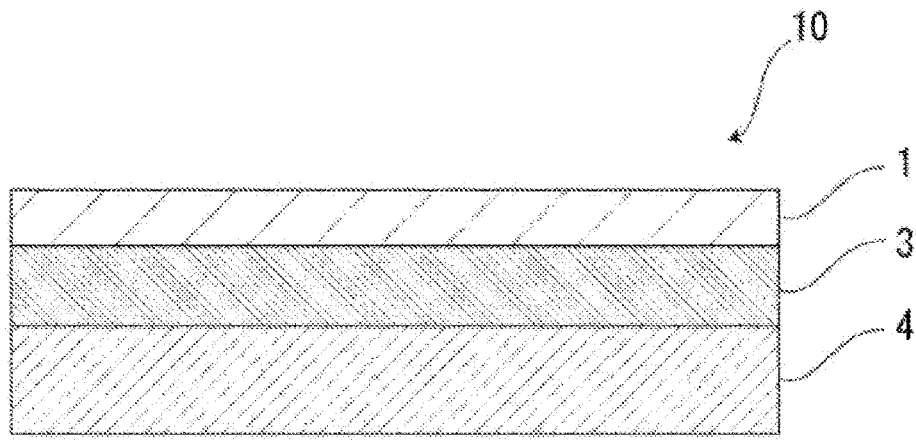
FIG. 1 is a schematic diagram showing an example of a cross-sectional structure of an exterior material for electrical storage devices according to the present disclosure.

As shown in, for example, FIG. 1, an exterior material 10 for electrical storage devices according to the present disclosure includes a laminate including a base material layer 1, a barrier layer 3 and an inner layer 4 in this order. In the exterior material 10 for electrical storage devices, the base material layer 1 is on the outermost layer side. In construction of the electrical storage device using the exterior material 10 for electrical storage devices and electrical storage device elements, the electrical storage device elements are put in a space formed by heat-sealing the peripheral portions of inner layers 4 (it is a heat-sealable resin layer 41 that forms the outermost surface) of the exterior material 10 for electrical storage devices which face each other.

Figure 2:
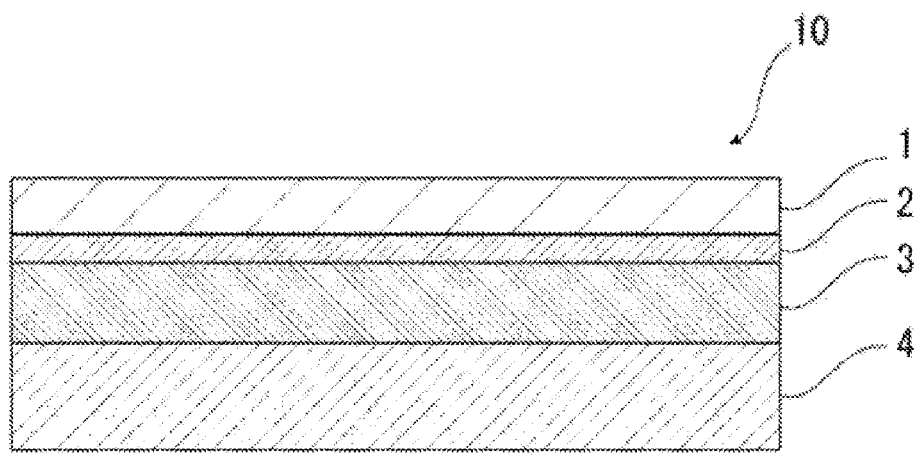
FIG. 2 is a schematic diagram showing an example of a cross-sectional structure of an exterior material for electrical storage devices according to the present disclosure.
Figure 4:
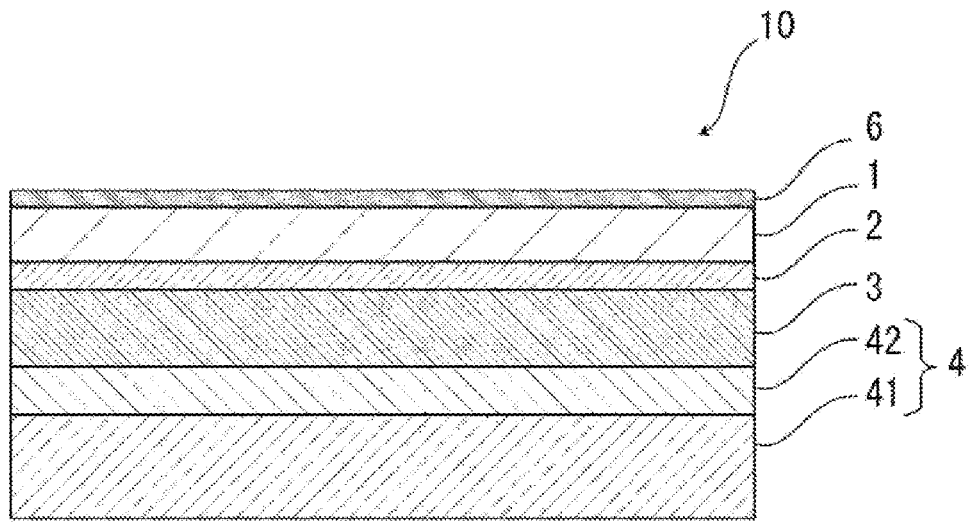
FIG. 4 is a schematic diagram showing an example of a cross-sectional structure of an exterior material for electrical storage devices according to the present disclosure.

As shown in, for example, FIGS. 2 and 4, the exterior material 10 for electrical storage devices may have an adhesive agent layer 2 between the base material layer 1 and the barrier layer 3 if necessary for the purpose of, for example, improving bondability between these layers. As shown in FIG. 4, a surface coating layer 6 or the like may be provided on the outside of the base material layer 1 (on a side opposite to the heat-sealable resin layer 41 side) if necessary.

Figure 3:
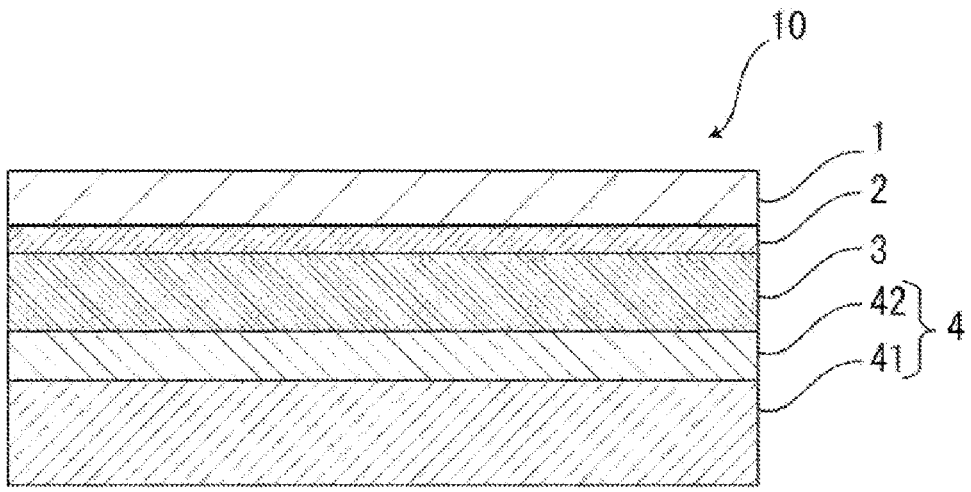
FIG. 3 is a schematic diagram showing an example of a cross-sectional structure of an exterior material for electrical storage devices according to the present disclosure.

The inner layer 4 may include a single layer, or may include a multiple layer. When the inner layer 4 is a single layer, the inner layer 4 is the heat-sealable resin layer 41. When the inner layer 4 is a multiple layer, the inner layer 4 may include an adhesive layer 42 on the barrier layer 3 side in addition to the heat-sealable resin layer 41 as shown in FIGS. 3 and 4. The adhesive layer 42 is in contact with the barrier layer 3 (a corrosion-resistant film when the corrosion-resistant is present). Further, the heat-sealable resin layer 41 may be a single layer, or may be a multiple layer. In examples described later, the heat-sealable resin layer 41 includes a first heat-sealable resin layer and a second heat-sealable resin layer.

The thickness of the laminate forming the exterior material 10 for electrical storage devices is not particularly limited, and is preferably about 190 μm or less, about 155 μm or less, or about 120 μm or less, from the viewpoint of cost reduction, energy density improvement, and the like. The thickness of the laminate forming the exterior material 10 for electrical storage devices is preferably about 35 μm or more, about 45 μm or more, or about 60 μm or more, from the viewpoint of maintaining the function of an exterior material for electrical storage devices, which is protection of an electrical storage device element. The laminate forming the exterior material 10 for electrical storage devices is preferably in the range of, for example, about 35 to 190 μm, about 35 to 155 μm, about 35 to 120 μm, about 45 to 190 μm, about 45 to 155 μm, about 45 to 120 μm, about 60 to 190 μm, about 60 to 155 μm, and about 60 to 120 μm, particularly preferably about 60 to 155 μm.

In the exterior material 10 for electrical storage devices, the ratio of the total thickness of the base material layer 1, the adhesive agent layer 2 provided if necessary, the barrier layer 3, the inner layer 4 and the surface coating layer 6 provided if necessary to the thickness (total thickness) of the laminate forming the exterior material 10 for electrical storage devices is preferably 90% or more, more preferably 95% or more, still more preferably 98% or more. As a specific example, when the exterior material 10 for electrical storage devices according to the present disclosure includes the base material layer 1, the adhesive agent layer 2, the barrier layer 3, the adhesive layer 42 and the heat-sealable resin layer 41, the ratio of the total thickness of these layers to the thickness (total thickness) of the laminate forming the exterior material 10 for electrical storage devices is preferably 90% or more, more preferably 95% or more, still more preferably 98% or more. In addition, when the exterior material 10 for electrical storage devices according to the present disclosure is a laminate including the base material layer 1, the adhesive agent layer 2, the barrier layer 3 and the heat-sealable resin layer 41, the ratio of the total thickness of these layers to the thickness (total thickness) of the laminate forming the exterior material 10 for electrical storage devices may be, for example, 80% or more, preferably 90% or more, more preferably 95% or more, still more preferably 98% or more.

2. Layers Forming Exterior Material for Electrical Storage Devices

Base Material Layer 1

In the present disclosure, the base material layer 1 is a layer provided for the purpose of, for example, exhibiting a function as a base material of the exterior material for electrical storage devices. The base material layer 1 is located on the outer layer side of the exterior material for electrical storage devices.

The material that forms the base material layer 1 is not particularly limited as long as it has a function as a base material, i.e. at least insulation quality. The base material layer 1 can be formed using, for example, a resin, and the resin may contain additives described later.

When the base material layer 1 is formed of a resin, the base material layer 1 may be, for example, a resin film formed of a resin, or may be formed by applying a resin. The resin film may be an unstretched film or a stretched film. Examples of the stretched film include uniaxially stretched films and biaxially stretched films, and biaxially stretched films are preferable. Examples of the stretching method for forming a biaxially stretched film include a sequential biaxial stretching method, an inflation method, and a simultaneous biaxial stretching method. Examples of the method for applying a resin include a roll coating method, a gravure coating method and an extrusion coating method.

Examples of the resin that forms the base material layer 1 include resins such as polyester, polyamide, polyolefin, epoxy resin, acrylic resin, fluororesin, polyurethane, silicone resin and phenol resin, and modified products of these resins. The resin that forms the base material layer 1 may be a copolymer of these resins or a modified product of the copolymer. Further, a mixture of these resins may be used.

Of these resins, polyester and polyamide are preferable as resins that form the base material layer 1.

Specific examples of the polyester resin include polyethylene terephthalate, polybutylene terephthalate, polyethylene naphthalate, polybutylene naphthalate, polyethylene isophthalate, and copolyesters. Examples of the copolyester include copolyesters having ethylene terephthalate as a main repeating unit. Specific examples thereof include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene (terephthalate/decane dicarboxylate). These polyesters may be used alone, or may be used in combination of two or more thereof.

Specific examples of the polyamide include polyamides such as aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polyamide MXD6 (polymethaxylylene adipamide); cycloaliphatic polyamides such as polyamide PACM6 (polybis(4-aminocyclohexyl)methaneadipamide; polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

The base material layer 1 contains preferably at least one of a polyester film, a polyamide film and a polyolefin film, preferably at least one of a stretched polyester film, a stretched polyamide film and a stretched polyolefin film, still more preferably at least one of a stretched polyethylene terephthalate film, a stretched polybutylene terephthalate film, a stretched nylon film and a stretched polypropylene film, even more preferably at least one of a biaxially stretched polyethylene terephthalate film, a biaxially stretched polybutylene terephthalate film, a biaxially stretched nylon film, and a biaxially stretched polypropylene film.

The base material layer 1 may be a single layer, or may include two or more layers. When the base material layer 1 includes two or more layers, the base material layer 1 may be a laminate obtained by laminating resin films with an adhesive or the like, or a resin film laminate obtained by co-extruding resins to form two or more layers. The resin film laminate obtained by co-extruding resins to form two or more layers may be used as the base material layer 1 in an unstretched state, or may be uniaxially stretched or biaxially stretched and used as the base material layer 1.

Specific examples of the resin film laminate with two or more layers in the base material layer 1 include laminates of a polyester film and a nylon film, nylon film laminates with two or more layers, and polyester film laminates with two or more layers. Laminates of a stretched nylon film and a stretched polyester film, stretched nylon film laminates with two or more layers, and stretched polyester film laminates with two or more layers are preferable. For example, when the base material layer 1 is a resin film laminate with two layers, the base material layer 1 is preferably a laminate of a polyester resin film and a polyester resin film, a laminate of a polyamide resin film and a polyamide resin film, or a laminate of a polyester resin film and a polyamide resin film, more preferably a laminate of a polyethylene terephthalate film and a polyethylene terephthalate film, a laminate of a nylon film and a nylon film, or a laminate of a polyethylene terephthalate film and a nylon film. Since the polyester resin is hardly discolored even in the case where for example, an electrolytic solution is deposited on the surface, it is preferable that the polyester resin film is located at the outermost layer of the base material layer 1 when the base material layer 1 is a resin film laminate with two or more layers.

When the base material layer 1 is a resin film laminate with two or more layers, the two or more resin films may be laminated with an adhesive interposed therebetween. Specific examples of the preferred adhesive include the same adhesives as those exemplified for the adhesive agent layer 2 described later. The method for laminating a resin film having two or more layers is not particularly limited, and a known method can be employed. Examples thereof include a dry lamination method, a sand lamination method, an extrusion lamination method and a thermal lamination method, and a dry lamination method is preferable. When the resin film is laminated by a dry lamination method, it is preferable to use a polyurethane adhesive as the adhesive. Here, the thickness of the adhesive is, for example, about 2 to 5 μm. In addition, the lamination may be performed with an anchor coat layer formed on the resin film. Examples of the anchor coat layer include the same adhesives as those exemplified for the adhesive agent layer 2 described later. Here, the thickness of the anchor coat layer is, for example, about 0.01 to 1.0 μm.

Additives such as a slipping agent, a flame retardant, an antiblocking agent, an antioxidant, a light stabilizer, a tackifier and an antistatic agent may be present on at least one of the surface of the base material layer 1 and/or inside the base material layer 1. The additives may be used alone, or may be used in combination of two or more thereof.

In the present disclosure, it is preferable that a slipping agent is present on the surface of the base material layer 1 from the viewpoint of enhancing the moldability of the exterior material for electrical storage devices. The slipping agent is not particularly limited, and is preferably an amide-based slipping agent. Specific examples of the amide-based slipping agent include saturated fatty acid amides, unsaturated fatty acid amides, substituted amides, methylol amides, saturated fatty acid bisamides, unsaturated fatty acid bisamides, fatty acid ester amides, and aromatic bisamides. Specific examples of the saturated fatty acid amide include lauric acid amide, palmitic acid amide, stearic acid amide, behenic acid amide, and hydroxystearic acid amide. Specific examples of unsaturated fatty acid amide include oleic acid amide and erucic acid amide. Specific examples of the substituted amide include N-oleylpalmitic acid amide, N-stearyl stearic acid amide, N-stearyl oleic acid amide, N-oleyl stearic acid amide, and N-stearyl erucic acid amide. Specific examples of the methylolamide include methylolstearic acid amide. Specific examples of the saturated fatty acid bisamide include methylenebisstearic acid amide, ethylenebiscapric acid amide, ethylenebislauric acid amide, ethylenebisstearic acid amide, ethylenebishydroxystearic acid amide, ethylenebisbehenic acid amide, hexamethylenebisstearic acid amide, hexamethylenehydroxystearic acid amide, N,N'-distearyl adipic acid amide, and N,N'-distearyl sebacic acid amide. Specific examples of the unsaturated fatty acid bisamide include ethylenebisoleic acid amide, ethylenebiserucic acid amide, hexamethylenebisoleic acid amide, N,N'-dioleyladipic acid amide, and N,N'-dioleylsebacic acid amide. Specific examples of the fatty acid ester amide include stearoamideethyl stearate. Specific examples of the aromatic bisamide include m-xylylenebisstearic acid amide, m-xylylenebishydroxystearic acid amide, and N,N'-distearylisophthalic acid amide. The slipping agents may be used alone, or may be used in combination of two or more thereof.

When the slipping agent is present on the surface of the base material layer 1, the amount of the slipping agent present is not particularly limited, and is preferably about 3 mg/m$^2$ or more, more preferably about 4 to 15 mg/m$^2$, still more preferably about 5 to 14 mg/m$^2$.

The slipping agent present on the surface of the base material layer 1 may be one obtained by exuding the slipping agent contained in the resin forming the base material layer 1, or one obtained by applying the slipping agent to the surface of the base material layer 1.

The thickness of the base material layer 1 is not particularly limited as long as a function as a base material is performed, and the thickness of the base material layer 1 is, for example, about 3 to 50 μm, preferably about 10 to 35 μm. When the base material layer 1 is a resin film laminate with two or more layers, the thickness of the resin film forming each layer is preferably about 2 to 25 μm.

Adhesive Agent Layer 2

In the exterior material for electrical storage devices of the present disclosure, the adhesive agent layer 2 is a layer provided between the base material layer 1 and the barrier layer 3 if necessary for the purpose of enhancing bondability between these layers.

The adhesive agent layer 2 is formed from an adhesive capable of bonding the base material layer 1 and the barrier layer 3. The adhesive used for forming the adhesive agent layer 2 is not limited, and may be any of a chemical reaction type, a solvent volatilization type, a heat melting type, a heat pressing type, and the like. The adhesive agent may be a two-liquid curable adhesive (two-liquid adhesive), a one-liquid curable adhesive (one-liquid adhesive), or a resin that does not involve curing reaction. The adhesive agent layer 2 may be a single layer or a multi-layer.

Specific examples of the adhesive component contained in the adhesive include polyester such as polyethylene terephthalate, polybutylene terephthalate, polyethylene naphthalate, polybutylene naphthalate, polyethylene isophthalate and copolyester; polyether; polyurethane; epoxy resins; phenol resins; polyamides such as nylon 6, nylon 66, nylon 12 and copolymerized polyamide; polyolefin-based resins such as polyolefins, cyclic polyolefins, acid-modified polyolefins and acid-modified cyclic polyolefins; cellulose; (meth)acrylic resins; polyimide; polycarbonate; amino resins such as urea resins and melamine resins; rubbers such as chloroprene rubber, nitrile rubber and styrene-butadiene rubber; and silicone resins. These adhesive components may be used alone, or may be used in combination of two or more thereof. Of these adhesive components, polyurethane-based adhesives are preferable. In addition, the adhesive strength of these resins used as adhesive components can be increased by using an appropriate curing agent in combination. As the curing agent, appropriate one is selected from polyisocyanate, a polyfunctional epoxy resin, an oxazoline group-containing polymer, a polyamine resin, an acid anhydride and the like according to the functional group of the adhesive component.

Examples of the polyurethane adhesive include polyurethane adhesives containing a first component containing a polyol compound and a second component containing an isocyanate compound. The polyurethane adhesive is preferably a two-liquid curable polyurethane adhesive having polyol such as polyester polyol, polyether polyol or acrylic polyol as a first component, and aromatic or aliphatic polyisocyanate as a second component. Examples of the polyurethane adhesive include polyurethane adhesives containing an isocyanate compound and a polyurethane compound obtained by reacting a polyol compound with an isocyanate compound in advance. Examples of the polyurethane adhesive include polyurethane adhesives containing a polyol compound and a polyurethane compound obtained by reacting a polyol compound with an isocyanate compound in advance. Examples of the polyurethane adhesive include polyurethane adhesives obtained by reacting a polyol compound with an isocyanate compound to form a polyurethane compound in advance, and reacting the polyurethane compound with moisture in the air or the like. It is preferable that polyester polyol having a hydroxyl group in the side chain in addition to a hydroxyl group at the end of the repeating unit is used as the polyol compound. Examples of the second component include aliphatic, alicyclic, aromatic and araliphatic isocyanate-based compounds. Examples of the isocyanate-based compound include hexamethylene diisocyanate (HDI), xylylene diisocyanate (XDI), isophorone diisocyanate (IPDI), hydrogenated XDI (H6XDI), hydrogenated MDI (H 12 MDI), tolylene diisocyanate (TDI), diphenylmethane diisocyanate (MDI) and naphthalene diisocyanate (NDI). Examples of the isocyanate-based compound also include polyfunctional isocyanate-modified products of one or more of these diisocyanates can be mentioned. It is also possible to use a multimer (e.g. a trimer) as the polyisocyanate compound. Examples of the multimer include adducts, biurets, and nurates. Since the adhesive agent layer 2 is formed of a polyurethane adhesive, excellent electrolytic solution resistance is imparted to the exterior material for electrical storage devices, so that peeling of the base material layer 1 is suppressed even if the electrolytic solution is deposited on the side surface.

Other components may be added to the adhesive agent layer 2 as long as bondability is not inhibited, and the adhesive agent layer 2 may contain a colorant, a thermoplastic elastomer, a tackifier, a filler, and the like. When the adhesive agent layer 2 contains a colorant, the exterior material for electrical storage devices can be colored. As the colorant, known colorants such as pigments and dyes can be used. The colorants may be used alone, or may be used in combination of two or more thereof.

The type of pigment is not particularly limited as long as the bondability of the adhesive agent layer 2 is not impaired. Examples of the organic pigment include azo-based pigments, phthalocyanine-based pigments, quinacridone-based pigments, anthraquinone-based pigments, dioxazine-based pigments, indigothioindigo-based pigments, perinone-perylene-based pigments, isoindolenine-based pigments and benzimidazolone-based pigments. Examples of the inorganic pigment include carbon black-based pigments, titanium oxide-based pigments, cadmium-based pigments, lead-based pigments, chromium-based pigments and iron-based pigments, and also fine powder of mica (mica) and fish scale foil.

Of the colorants, carbon black is preferable for the purpose of, for example, blackening the appearance of the exterior material for electrical storage devices.

The average particle diameter of the pigment is not particularly limited, and is, for example, about 0.05 to 5 μm, preferably about 0.08 to 2 μm. The average particle size of the pigment is a median diameter measured by a laser diffraction/scattering particle size distribution measuring apparatus.

The content of the pigment in the adhesive agent layer 2 is not particularly limited as long as the exterior material for electrical storage devices is colored, and the content is, for example, about 5 to 60 mass %, preferably 10 to 40 mass %.

The thickness of the adhesive agent layer 2 is not particularly limited as long as the base material layer 1 and the barrier layer 3 can be bonded to each other, and the thickness is, for example, about 1 μm or more, or about 2 μm or more. The thickness of the adhesive agent layer 2 is, for example, about 10 μm or less, or about 5 μm or less. The thickness of the adhesive agent layer 2 is preferably in the range of about 1 to 10 μm, about 1 to 5 μm, about 2 to 10 μm, or about 2 to 5 μm.

Colored Layer

The colored layer is a layer provided between the base material layer 1 and the barrier layer 3 if necessary (not shown). When the adhesive agent layer 2 is present, the colored layer may be provided between the base material layer 1 and the adhesive agent layer 2 or between the adhesive agent layer 2 and the barrier layer 3. The colored layer may be provided outside the base material layer 1. By providing the colored layer, the exterior material for electrical storage devices can be colored.

The colored layer can be formed by, for example, applying an ink containing a colorant to the surface of the base material layer 1, or the surface of the barrier layer 3. As the colorant, known colorants such as pigments and dyes can be used. The colorants may be used alone, or may be used in combination of two or more thereof.

Specific examples of the colorant contained in the colored layer include the same colorants as those exemplified in the section [Adhesive Agent Layer 2].

Barrier Layer 3

In the exterior material for electrical storage devices, the barrier layer 3 is a layer which suppresses at least ingress of moisture.

Examples of the barrier layer 3 include metal foils, deposited films and resin layers having a barrier property. Examples of the deposited film include metal deposited films, inorganic oxide deposited films and carbon-containing inorganic oxide deposited films, and examples of the resin layer include those of polyvinylidene chloride, fluorine-containing resins such as polymers containing chlorotrifluoroethylene (CTFE) as a main component, polymers containing tetrafluoroethylene (TFE) as a main component, polymers having a fluoroalkyl group, and polymers containing a fluoroalkyl unit as a main component, and ethylene vinyl alcohol copolymers. Examples of the barrier layer 3 include resin films provided with at least one of these deposited films and resin layers. A plurality of barrier layers 3 may be provided. Preferably, the barrier layer 3 contains a layer formed of a metal material. Specific examples of the metal material forming the barrier layer 3 include aluminum alloys, stainless steel, titanium steel and steel sheets. When the metal material is used as a metal foil, it is preferable that the metal material includes at least one of an aluminum alloy foil and a stainless steel foil.

The aluminum alloy is more preferably a soft aluminum alloy foil formed of, for example, an annealed aluminum alloy from the viewpoint of improving the moldability of the exterior material for electrical storage devices, and is preferably an aluminum alloy foil containing iron from the viewpoint of further improving the moldability. In the aluminum alloy foil containing iron (100 mass %), the content of iron is preferably 0.1 to 9.0 mass %, more preferably 0.5 to 2.0 mass %. When the content of iron is 0.1 mass % or more, it is possible to obtain an exterior material for electrical storage devices which has more excellent moldability. When the content of iron is 9.0 mass % or less, it is possible to obtain an exterior material for electrical storage devices which is more excellent in flexibility. Examples of the soft aluminum alloy foil include aluminum alloy foils having a composition specified in JIS H4160: 1994 A8021H-O, JIS H4160: 1994 A8079H-O, JIS H4000: 2014 A8021P-O, or JIS H4000: 2014 A8079P-O. If necessary, silicon, magnesium, copper, manganese or the like may be added. Softening can be performed by annealing or the like.

Examples of the stainless steel foil include austenitic stainless steel foils, ferritic stainless steel foils, austenitic/ferritic stainless steel foils, martensitic stainless steel foils and precipitation-hardened stainless steel foils. From the viewpoint of providing an exterior material for electrical storage devices which is further excellent in moldability, it is preferable that the stainless steel foil is formed of austenitic stainless steel.

Specific examples of the austenite-based stainless steel foil include SUS 304 stainless steel, SUS 301 stainless steel and SUS 316L stainless steel, and of these, SUS 304 stainless steel is especially preferable.

When the barrier layer 3 is a metal foil, the barrier layer 3 may perform a function as a barrier layer suppressing at least ingress of moisture, and has a thickness of, for example, about 9 to 200 µm. The thickness of the barrier layer 3 is preferably about 85 µm or less, more preferably about 50 µm or less, still more preferably about 40 µm or less, particularly preferably about 35 µm or less. The thickness of the barrier layer 3 is preferably about 10 µm or more, more preferably about 20 µm or more, still more preferably about 25 µm or more. The total thickness of the barrier layer 3 is preferably in the range of about 10 to 85 µm, about 10 to 50 µm, about 10 to 40 µm, about 10 to 35 µm, about 20 to 85 µm, about 20 to 50 µm, about 20 to 40 µm, about 20 to 35 µm, about 25 to 85 µm, about 25 to 50 µm, about 25 to 40 µm, or about 25 to 35 µm. When the barrier layer 3 is formed of an aluminum alloy foil, the thickness thereof is especially preferably in above-described range. In particular, when the barrier layer 3 includes a stainless steel foil, the thickness of the stainless steel foil is preferably about 60 µm or less, more preferably about 50 µm or less, still more preferably about 40 µm or less, even more preferably about 30 µm or less, particularly preferably about 25 µm or less. The thickness of the stainless steel foil is preferably about 10 µm or more, more preferably about 15 µm or more. The thickness of the stainless steel foil is preferably in the range of about 10 to 60 µm, about 10 to 50 µm, about 10 to 40 µm, about 10 to 30 µm, about 10 to 25 µm, about 15 to 60 µm, about 15 to 50 µm, about 15 to 40 µm, about 15 to 30 µm, or about 15 to 25 µm.

When the barrier layer 3 is a metal foil, it is preferable that a corrosion-resistant film is provided at least on a surface on a side opposite to the base material layer for preventing dissolution and corrosion. The barrier layer 3 may include a corrosion-resistant film on each of both surfaces. Here, the corrosion-resistant film refers to a thin film obtained by subjecting the surface of the barrier layer to, for example, hydrothermal denaturation treatment such as boehmite treatment, chemical conversion treatment, anodization treatment, plating treatment with nickel, chromium or the like, or corrosion prevention treatment by applying a coating agent to impart corrosion resistance (e.g. acid resistance and alkali resistance) to the barrier layer. Specifically, the corrosion-resistant film means a film which improves the acid resistance of the barrier layer (acid-resistant film), a film which improves the alkali resistance of the barrier layer (alkali-resistant film), or the like. One of treatments for forming the corrosion-resistant film may be performed, or two or more thereof may be performed in combination. In addition, not only one layer but also multiple layers can be formed. Further, of these treatments, the hydrothermal denaturation treatment and the anodization treatment are treatments in which the surface of the metal foil is dissolved with a treatment agent to form a metal compound excellent in corrosion resistance. The definition of the chemical conversion treatment may include these treatments. When the barrier layer 3 is provided with the corrosion-resistant film, the barrier layer 3 is regarded as including the corrosion-resistant film.

The corrosion-resistant film exhibits the effects of preventing delamination between the barrier layer (e.g. an aluminum alloy foil) and the base material layer during molding of the exterior material for electrical storage devices; preventing dissolution and corrosion of the surface of the barrier layer, particularly dissolution and corrosion of aluminum oxide present on the surface of the barrier layer when the barrier layer is an aluminum alloy foil, by hydrogen fluoride generated by reaction of an electrolyte with moisture; improving the bondability (wettability) of the surface of the barrier layer; preventing delamination between the base material layer and the barrier layer during heat-sealing; and preventing delamination between the base material layer and the barrier layer during molding.

Various corrosion-resistant films formed by chemical conversion treatment are known, and examples thereof include mainly corrosion-resistant films containing at least one of a phosphate, a chromate, a fluoride, a triazine thiol compound, and a rare earth oxide. Examples of the chemical conversion treatment using a phosphate or a chromate include chromic acid chromate treatment, phosphoric acid chromate treatment, phosphoric acid-chromate treatment and chromate treatment, and examples of the chromium compound used in these treatments include chromium nitrate, chromium fluoride, chromium sulfate, chromium acetate, chromium oxalate, chromium biphosphate, acetylacetate chromate, chromium chloride and chromium potassium sulfate. Examples of the phosphorus compound used in these treatments include sodium phosphate, potassium phosphate, ammonium phosphate and polyphosphoric acid. Examples of the chromate treatment include etching chromate treatment, electrolytic chromate treatment and coating-type chromate treatment, and coating-type chromate treatment is preferable. This coating-type chromate treatment is treatment in which at least a surface of the barrier layer (e.g. an aluminum alloy foil) on the inner layer side is first degreased by a well-known treatment method such as an alkali immersion method, an electrolytic cleaning method, an acid cleaning method, an electrolytic acid cleaning method or an acid activation method, and a treatment solution containing a metal phosphate such as Cr (chromium) phosphate, Ti (titanium) phosphate, Zr (zirconium) phosphate or Zn (zinc) phosphate or a mixture of these metal salts as a main component, a treatment solution containing any of non-metal salts of phosphoric acid and a mixture of these non-metal salts as a main component, or a treatment solution formed of a mixture of any of these salts and a synthetic resin or the like is then applied to the degreased surface by a well-known coating method such as a roll coating method, a gravure printing method or an immersion method, and dried. As the treatment liquid, for example, various solvents such as water, an alcohol-based solvent, a hydrocarbon-based solvent, a ketone-based solvent, an ester-based solvent, and an ether-based solvent can be used, and water is preferable. Examples of the resin component used here include polymers such as phenol-based resins and acryl-based resins, and examples of the treatment include chromate treatment using an aminated phenol polymer having any of repeating units represented by the following general formulae (1) to (4). In the aminated phenol polymer, the repeating units represented by the following general formulae (1) to (4) may be contained alone, or may be contained in combination of two or more thereof. The acryl-based resin is preferably polyacrylic acid, an acrylic acid-methacrylic acid ester copolymer, an acrylic acid-maleic acid copolymer, an acrylic acid-styrene copolymer, or a derivative thereof such as a sodium salt, an ammonium salt or an amine salt thereof. In particular, a derivative of polyacrylic acid such as an ammonium salt, a sodium salt or an amine salt of polyacrylic acid is preferable. In the present disclosure, the polyacrylic acid means a polymer of acrylic acid. The acryl-based resin is also preferably a copolymer of acrylic acid and dicarboxylic acid or dicarboxylic anhydride, and is also preferably an ammonium salt, a sodium salt or an amine salt of a copolymer of acrylic acid and dicarboxylic acid or dicarboxylic anhydride. The acryl-based resins may be used alone, or may be used in combination of two or more thereof.

[Chemical Formula 3]

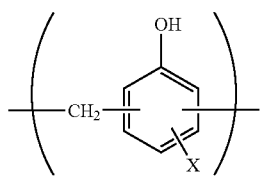

(1)

[Chemical Formula 4]

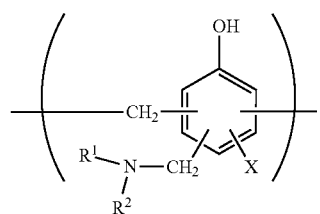

(2)

[Chemical Formula 5]

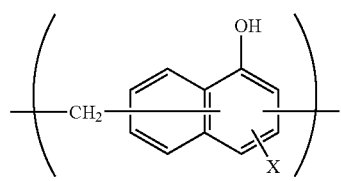

(3)

[Chemical Formula 6]

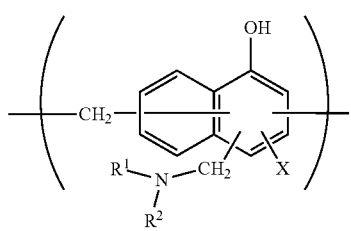

(4)

In the general formulae (1) to (4), X represents a hydrogen atom, a hydroxy group, an alkyl group, a hydroxyalkyl group, an allyl group, or a benzyl group. $R^1$ and $R^2$ are the same or different, and each represents a hydroxy group, an alkyl group, or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, an n-propyl group, an isopropyl group, an n-butyl group, an isobutyl group, and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxy group or a hydroxyalkyl group. A number average molecular weight of the aminated phenol polymer having repeating units represented by the general formulae (1) to (4) is preferably about 500 to 1,000,000, and more preferably about 1,000 to 20,000, for example. The aminated phenol polymer is produced by, for example, performing polycondensation of a phenol compound or a naphthol compound with formaldehyde to prepare a polymer including repeating units represented by the general formula (1) or the general formula (3), and then introducing a functional group ($—CH_2NR^1R^2$) into the obtained polymer using formaldehyde and an amine ($R^1R^2NH$). The aminated phenol polymers are used alone, or used in combination of two or more thereof.

Other examples of the corrosion-resistant film include thin films formed by corrosion prevention treatment of coating type in which a coating agent containing at least one selected from the group consisting of a rare earth element oxide sol, an anionic polymer and a cationic polymer is applied. The coating agent may further contain phosphoric acid or a phosphate, and a crosslinker for crosslinking the polymer. In the rare earth element oxide sol, fine particles of a rare earth element oxide (e.g. particles having an average particle diameter of 100 nm or less) are dispersed in a liquid dispersion medium. Examples of the rare earth element oxide include cerium oxide, yttrium oxide, neodymium oxide and lanthanum oxide, and cerium oxide is preferable from the viewpoint of further improving adhesion. The rare earth element oxides contained in the corrosion-resistant film can be used alone, or used in combination of two or more thereof. As the liquid dispersion medium for the rare earth element oxide, for example, various solvents such as water, an alcohol-based solvent, a hydrocarbon-based solvent, a ketone-based solvent, an ester-based solvent, and an ether-based solvent can be used, and water is preferable. For example, the cationic polymer is preferably polyethyleneimine, an ion polymer complex formed of a polymer having polyethyleneimine and a carboxylic acid, primary amine-grafted acrylic resins obtained by graft-polymerizing a primary amine with an acrylic main backbone, polyallylamine or a derivative thereof, or aminated phenol. The anionic polymer is preferably poly (meth)acrylic acid or a salt thereof, or a copolymer containing (meth)acrylic acid or a salt thereof as a main component. The crosslinker is preferably at least one selected from the group consisting of a silane coupling agent and a compound having any of functional groups including an isocyanate group, a glycidyl group, a carboxyl group and an oxazoline group. In addition, the phosphoric acid or phosphate is preferably condensed phosphoric acid or a condensed phosphate.

Examples of the corrosion-resistant film include films formed by applying a dispersion of fine particles of a metal oxide such as aluminum oxide, titanium oxide, cerium oxide or tin oxide or barium sulfate in phosphoric acid to the surface of the barrier layer and performing baking treatment at 150° C. or higher.

The corrosion-resistant film may have a laminated structure in which at least one of a cationic polymer and an anionic polymer is further laminated if necessary. Examples of the cationic polymer and the anionic polymer include those described above.

The composition of the corrosion-resistant film can be analyzed by, for example, time-of-flight secondary ion mass spectrometry.

The amount of the corrosion-resistant film to be formed on the surface of the barrier layer 3 in the chemical conversion treatment is not particularly limited, but for example when the coating-type chromate treatment is performed, and it is desirable that the chromic acid compound be contained in an amount of, for example, about 0.5 to 50 mg, preferably about 1.0 to 40 mg, in terms of chromium, the phosphorus compound be contained in an amount of, for example, about 0.5 to 50 mg, preferably about 1.0 to 40 mg, in terms of phosphorus, and the aminated phenol polymer be contained in an amount of, for example, about 1.0 to 200 mg, preferably about 5.0 to 150 mg, per 1 m² of the surface of the barrier layer 3.

The thickness of the corrosion-resistant film is not particularly limited, and is preferably about 1 nm to 20 μm, more preferably about 1 nm to 100 nm, still more preferably about 1 nm to 50 nm from the viewpoint of the cohesive force of the film and the adhesive strength with the barrier layer and the heat-sealable resin layer. The thickness of the corrosion-resistant film can be measured by observation with a transmission electron microscope or a combination of observation with a transmission electron microscope and energy dispersive X-ray spectroscopy or electron beam energy loss spectroscopy. By analyzing the composition of the corrosion-resistant film using time-of-flight secondary ion mass spectrometry, peaks derived from secondary ions from, for example, Ce, P and O (e.g. at least one of $Ce_2PO_4^+$, $CePO_4^-$ and the like) and secondary ions from, for example, Cr, P and O (e.g. at least one of $CrPO_2^+$, $CrPO_4^-$ and the like) are detected.

The chemical conversion treatment is performed in the following manner: a solution containing a compound to be used for formation of a corrosion-resistant film is applied to the surface of the barrier layer by a bar coating method, a roll coating method, a gravure coating method, an immersion method or the like, and heating is then performed so that the temperature of the barrier layer is about 70 to about 200° C. The barrier layer may be subjected to a degreasing treatment by an alkali immersion method, an electrolytic cleaning method, an acid cleaning method, an electrolytic acid cleaning method or the like before the barrier layer is subjected to a chemical conversion treatment. When a degreasing treatment is performed as described above, the chemical conversion treatment of the surface of the barrier layer can be further efficiently performed. When an acid degreasing agent with a fluorine-containing compound dissolved in an inorganic acid is used for degreasing treatment, not only a metal foil degreasing effect can be obtained but also a metal fluoride can be formed as a passive state, and in this case, only degreasing treatment may be performed.

Inner Layer 4

The inner layer 4 is a layer located inside the barrier layer 3. The inner layer 4 may include a single layer, or may include a multiple layer. When the inner layer 4 is a single layer, the inner layer 4 is the heat-sealable resin layer 41. When the inner layer 4 is a multiple layer, the inner layer 4 may include an adhesive layer 42 on the barrier layer 3 side in addition to the heat-sealable resin layer 41 as shown in FIGS. 3 and 4. The adhesive layer 42 is located between the barrier layer 3 and the heat-sealable resin layer 41, and is in contact with the barrier layer 3 (a corrosion-resistant film when the barrier layer 3 includes the corrosion-resistant). The adhesive layer 42 has a function of bonding the barrier layer 3 and the heat-sealable resin layer 41 to each other. The heat-sealable resin layer 41 may be a single layer, or may be a multiple layer. In examples described later, the heat-sealable resin layer 41 includes a first heat-sealable resin layer and a second heat-sealable resin layer.

The inner layer 4 contains a compound represented by the following general formula (A).

[Chemical Formula 7]

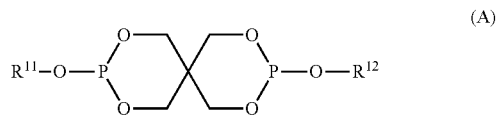

(A)

The compound represented by the general formula (A) is a phosphorus-based antioxidant. By using any of various analysis methods such as NMR, it is confirmed that the inner layer 4 contains the compound represented by general formula (A).

In general formula (A), $R^{11}$ and $R^{12}$ are each independently an alkyl group having 1 to 18 carbon atoms, or a phenyl group optionally having a substituent. In particular, it is preferable that $R^{11}$ and $R^{12}$ are each independently a phenyl group optionally having a substituent. The inner layer 4 may contain one or two or more types of compounds represented by general formula (A).

In general formula (A), it is preferable that the phenyl groups of $R^{11}$ and $R^{12}$ each independently have, as a substituent, at least one group selected from the group consisting of an alkyl group having 1 to 9 carbon atoms, a cycloalkyl group having 5 to 8 carbon atoms, an alkylcycloalkyl group having 6 to 12 carbon atoms, and an aralkyl group having 7 to 12 carbon atoms. It is preferable that the phenyl group has, as a substituent, at least one of an alkyl group having 1 to 9 carbon atoms and an aralkyl group having 7 to 12 carbon atoms, among the above-mentioned groups. Further, the number of substituents in the phenyl group of each of $R^{11}$ and $R^{12}$ may be 1 to 5, and is preferably 2 to 3.

Preferred specific examples of the compound represented by general formula (A) include a compound represented by the following formula (A') and a compound represented by the following formula (A").

[Chemical Formula 8]

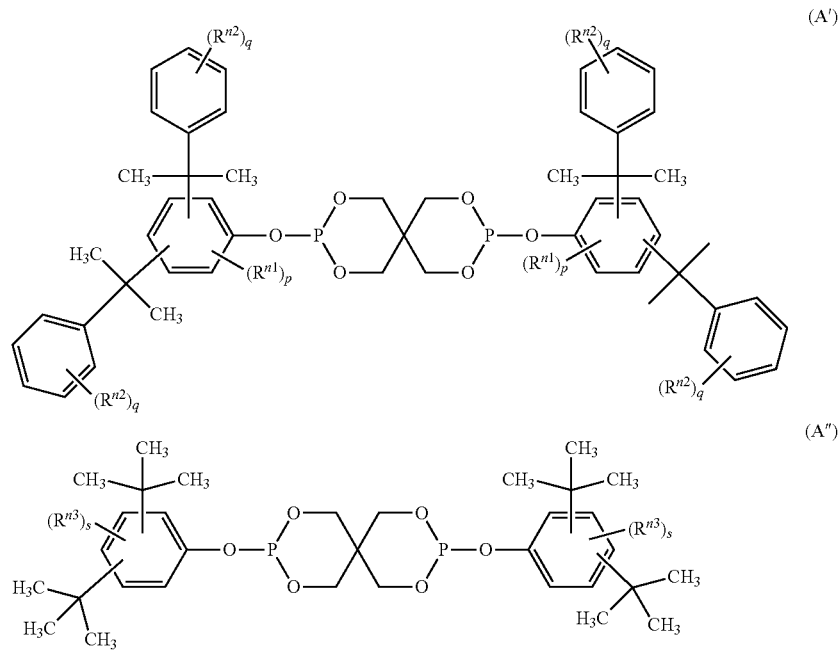

(A')

(A")

In general formula (A'), $R^{n1}$ and $R^{n2}$ each independently represent a substituent other than hydrogen. Each p independently represents an integer of 0 to 3, and each q independently represents an integer of 0 to 5. In general formula (A"), each $R^{n3}$ independently represents an alkyl group having 1 to 9 carbon atoms. each s independently represents an integer of 0 to 3.

In general formula (A'), it is preferable that each $R^{n1}$ is independently an alkyl group having 1 to 18 carbon atoms, or a phenyl group optionally having a substituent. In general formula (A'), it is preferable that each $R^{n2}$ is independently an alkyl group having 1 to 18 carbon atoms, or a phenyl group optionally having a substituent.

Further, preferred specific examples of the compound represented by general formula (A) include a compound represented by the following formula (A1) (bis (2,4-dicumylphenyl)pentaerythritol diphosphite) and a compound represented by the following formula (A2) (bis (2,6-di-t-butyl-4-methylphenyl)pentaerythritol diphosphite).

[Chemical Formula 9]

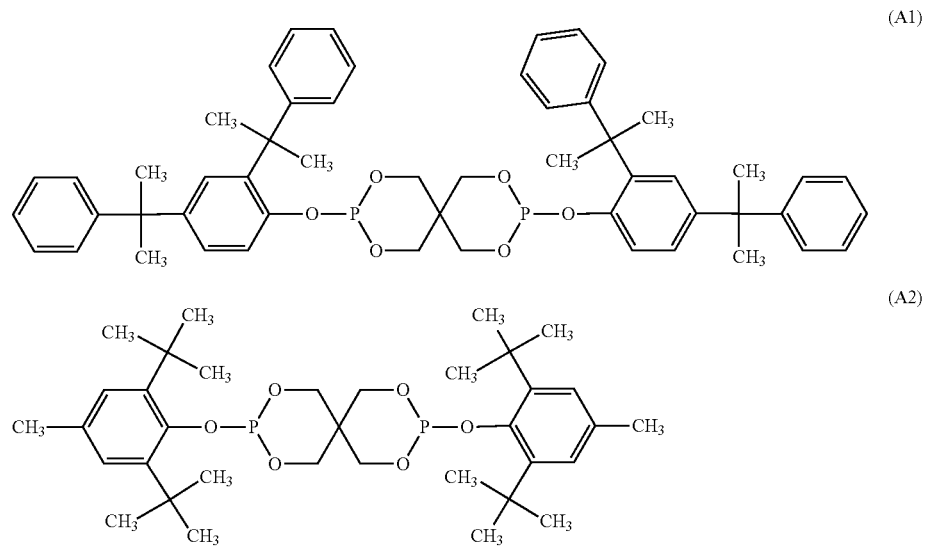

(A1)

(A2)

It is particularly preferable that the inner layer 4 contains a compound represented by formula (A1) as a compound represented by general formula (A).

As described above, the inner layer 4 may be a single layer, or may be a multiple layer. When the inner layer 4 is a multiple layer, at least one layer present in the inner layer 4 may contain a compound represented by general formula (A). For example, the compound represented by general formula (A) may be present in both the heat-sealable resin layer 41 and the adhesive layer 42, may be present only in the heat-sealable resin layer 41, or may be present only in the adhesive layer 42. Since at least one of the layers forming the inner layer 4 contains a compound represented by general formula (A), a resin for forming the layer can be heated to a higher temperature than before (e.g. 300° C. or higher) to form the layer to shorten the lead time. The layer is inhibited from being degraded by a high temperature, and thus can exhibit high insulation quality.

In the inner layer 4, the content ratio of the compound represented by the general formula (A) in the layer containing the compound is not particularly limited as long as the aforementioned effects of the present disclosure are exhibited, and the content ratio is preferably about 0.01 mass % or more, more preferably about 0.03% or more, still more preferably about 0.05 mass % or more, from the viewpoint of more suitably exhibiting the effects of the present disclosure. The content ratio is preferably about 2 mass % or less, more preferably about 1 mass % or less, still more preferably about 0.5 mass % or less. The content ratio is preferably in the range of about 0.01 to 2 mass %, about 0.01 to 1 mass %, about 0.01 to 0.5 mass %, about 0.03 to 2 mass %, about 0.03 to 1 mass %, about 0.03 to 0.5 mass %, about 0.05 to 2 mass %, about 0.05 to 1 mass %, or about 0.05 to 0.5 mass %.

In the electrical storage device, the inner layer 4 is in contact with the electrolytic solution, and therefore there may be an adverse effect of elution of the antioxidant contained in the inner layer 4 into the electrolytic solution, but the compound represented by formula (A1) has low solubility in an electrolytic solution solvent, and an effect of having little adverse effect on the characteristics of the electrical storage device even if the added amount is increased for improving insulation quality is also expected. Examples of the solvent of the electrolytic solution for the electrical storage device include cyclic carbonates such as ethylene carbonate (EC), propylene carbonate (PC), butylene carbonate (BC) and vinylene carbonate (VC); chain carbonates such as dimethyl carbonate (DMC), diethyl carbonate (DEC), ethyl methyl carbonate (EMC) and dipropyl carbonate (DPC); aliphatic carboxylic acid esters such as methyl formate, methyl acetate, methyl propionate and ethyl propionate; γ-lactones such as γ-butyrolactone; chain ethers such as 1,2-dimethoxyethane (DME), 1,2-diethoxyethane (DEE) and ethoxymethoxyethane (EME); cyclic ethers such as tetrahydrofuran and 2-methyltetrahydrofuran; and dimethylsulfoxide, formamide, acetamide, dimethylformamide, dimethylacetamide, dioxolane, acetonitrile, trimethoxymethane, dioxolane derivatives, sulfolane, methylsulfolane, propylene carbonate derivatives, tetrahydrofuran derivatives and dimethyl sulfoxide. These solvents can be used alone or in combination of two or more thereof. Among them, at least one of a cyclic carbonate, a chain carbonate and an aliphatic carboxylic acid ester is preferably used, and in particular, a mixed system of a cyclic carbonate with a chain carbonate, or a mixed system of cyclic carbonate with a chain carbonate and an aliphatic carboxylic acid ester is preferably used.

It is preferable that the inner layer 4 further contains at least one selected from the group consisting of a phosphorus-based antioxidant different from a compound represented by general formula (A), a phenol-based antioxidant, and a bifunctional processing stabilizer. It is preferable that each of the antioxidant and the processing stabilizer is contained in a layer containing the compound of the inner layer 4 which is represented by general formula (A).

Specific examples of the preferred combination of the antioxidant and the processing stabilizer contained in the inner layer 4 include an aspect in which the inner layer 4 contains a compound represented by general formula (A) and a phenol-based antioxidant, an aspect in which the inner layer 4 contains a compound represented by general formula (A), a phenol-based antioxidant and a bifunctional processing stabilizer, and an aspect in which the inner layer 4 contains a compound represented by general formula (A), a phosphorus-based antioxidant different from a compound represented by general formula (A), a phenol-based antioxidant, and a bifunctional processing stabilizer. Among these aspects, an aspect in which the inner layer 4 contains a compound represented by general formula (A), a phenol-based antioxidant and a bifunctional processing stabilizer, and an aspect in which the inner layer 4 contains a compound represented by general formula (A), a phosphorus-based antioxidant different from a compound represented by general formula (A), a phenol-based antioxidant, and a bifunctional processing stabilizer are particularly preferable.

The phosphorus-based antioxidant different from a compound represented by general formula (A) is not particularly limited, and a known phosphorus-based antioxidant can be used. Specific examples of the phosphorus-based antioxidant different from a compound represented by general formula (A) include tris (2,4-di-t-butylphenoxy)phosphine, 2,2-methylenebis(4,6-di-t-butylphenyl)-2-ethylhexyl phosphite, 4,4'-butylidene-bis(3-methyl-6-t-butylphenylditridecyl) phosphite, 6-[3-(3-t-butyl-4-hydroxy-5-methylphenyl) propoxy]-2,4,8,10-tetra-t-butyldibenz[d, f][1,3,2] dioxaphosphepine), and tetrakis(2,4-di-t-butylphenyl)-4,4'-bisphenyldiphosphonite. When the inner layer 4 contains the phosphorus-based antioxidant, one type or two or more types of the phosphorus-based antioxidants may be contained.

When the inner layer 4 contains the phosphorus-based antioxidant, the content ratio of the phosphorus-based antioxidant in a layer containing the phosphorus-based antioxidant in the inner layer 4 is not particularly limited as long as the aforementioned effects of the present disclosure are exhibited, and the content ratio is preferably about 0.01 mass % or more, more preferably about 0.03 mass % or more, from the viewpoint of more suitably exhibiting the effects of the present disclosure. The content ratio is preferably about 1 mass % or less, more preferably about 0.5 mass % or less, still more preferably about 0.3 mass % or less. The content ratio is preferably in the range of about 0.01 to 1 mass %, about 0.01 to 0.5 mass %, about 0.01 to 0.3 mass %, about 0.03 to 1 mass %, about 0.03 to 0.5 mass %, or about 0.03 to 0.3 mass %.

When the inner layer 4 contains the phosphorus-based antioxidant, the content ratio of a compound represented by general formula (A) in the phosphorus-based antioxidant contained in the inner layer 4 is preferably equal to or greater than the content ratio of the phosphorus-based antioxidant different from a compound represented by general formula (A) for exhibiting further excellent insulation quality. The mass ratio between the content ratio of a compound represented by general formula (A) and the content ratio of the phosphorus-based antioxidant different from a compound represented by general formula (A) (content ratio of compound represented by general formula (A):content of phosphorus antioxidant different from compound represented by general formula (A)) is preferably about 50:50 to 99:1, more preferably about 60:40 to 99:1.

The phenol-based antioxidant is not particularly limited, and a known phenol-based antioxidant can be used. Specific examples of the phenol-based antioxidant include tetrakis [methylene-3-(3,5-di-t-butyl-4-hydroxyphenyl)propionate] methane, 1,3,5-tris[[3,5-bis(1,1-dimethylethyl)-4-hydroxyphenyl] methyl]-1,3,5-triazine-2,4,6(1H,3H,5H)-trione, octadecyl-3-(3,5-di-t-butyl-4-hydroxyphenyl)propionate, and 3,9-bis[2-[3-(3-t-butyl-4-hydroxy-5-methylphenyl)propionyloxy]-1,1-dimethylethyl]-2,4,8,10-tetraoxaspiro(5,5) undecane. When the inner layer 4 contains the phenol-based antioxidant, one type or two or more types of the phenol-based antioxidants may be contained.

When the inner layer 4 contains the phenol-based antioxidant, the content ratio of the phenol-based antioxidant in a layer containing the phenol-based antioxidant in the inner layer 4 is not particularly limited as long as the aforementioned effects of the present disclosure are exhibited, and the content ratio is preferably about 0.01 mass % or more, more preferably above about 0.03, from the viewpoint of more suitably exhibiting the effects of the present disclosure. The content ratio is preferably about 0.5 or less, more preferably about 0.3 or less, still more preferably about 0.2 or less. The content ratio is preferably in the range of about 0.01 to 0.5 mass %, about 0.01 to 0.3 mass %, about 0.01 to 0.2 mass %, about 0.03 to 0.5 mass %, about 0.03 to 0.3 mass %, or about 0.03 to 0.2 mass %.

The bifunctional processing stabilizer is not particularly limited, and a known bifunctional processing stabilizer can be used. Examples of the bifunctional processing stabilizer include compounds having an acrylate group and a phenolic hydroxyl group in the same molecule, and examples thereof include a compound represented by the following general formula (B).

[Chemical Formula 10]

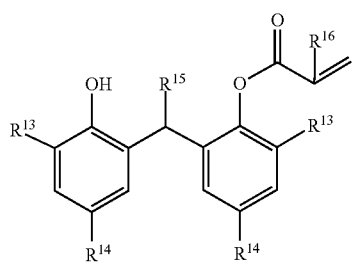

(B)

In general formula (B), $R^{13}$ and $R^{14}$ each independently represent an alkyl group having 1 to 8 carbon atoms, an aryl group having 6 to 12 carbon atoms, or an aralkyl group having 7 to 18 carbon atoms. $R^{15}$ represents a hydrogen atom or an alkyl group having 1 to 3 carbon atoms. $R^{16}$ represents a hydrogen atom or a methyl group.

Specific examples of the bifunctional processing stabilizer include 1'-hydroxy[2,2'-ethylidenebis [4,6-bis(1,1-dimethylpropyl)benzen]]-1-yl acrylate and 2-t-butyl-4-methyl-6-(2-hydroxy-3 t-butyl-5-methylbenzyl)phenyl acrylate. When the inner layer 4 contains the bifunctional processing stabilizer, one type or two or more types of the bifunctional processing stabilizers may be contained.

When the inner layer 4 contains the bifunctional processing stabilizer, the content ratio of the bifunctional processing stabilizer in a layer containing the bifunctional processing stabilizer in the inner layer 4 is not particularly limited as long as the aforementioned effects of the present disclosure are exhibited, and the content ratio is preferably about 0.01 mass % or more, more preferably about 0.03 mass % or more, from the viewpoint of more suitably exhibiting the effects of the present disclosure. The content ratio is preferably about 0.5 mass % or less, more preferably about 0.3 mass % or less, still more preferably about 0.2 mass % or less. The content ratio is preferably in the range of about 0.01 to 0.5 mass %, about 0.01 to 0.3 mass %, about 0.01 to 0.2 mass %, about 0.03 to 0.5 mass %, about 0.03 to 0.3 mass %, or about 0.03 to 0.2 mass %.

Hereinafter, the heat-sealable resin layer 41 present in the inner layer 4 and the adhesive layer 42 present if necessary will be described in detail. Descriptions of contents overlapping the contents described for the inner layer 4 will be omitted.

Heat-Sealable Resin Layer 41

In the exterior material for electrical storage devices according to the present disclosure, the heat-sealable resin layer 41 is a layer (sealant layer) which corresponds to an innermost layer and performs a function of hermetically sealing the electrical storage device element by heat-sealing the heat-sealable resin layer during construction of the electrical storage device.

The resin forming the heat-sealable resin layer 41 is not particularly limited as long as it can be heat-sealed, a resin containing a polyolefin backbone such as a polyolefin or an acid-modified polyolefin is preferable. The resin forming the heat-sealable resin layer 41 can be confirmed to contain a polyolefin backbone by an analysis method such as infrared spectroscopy or gas chromatography-mass spectrometry. It is preferable that a peak derived from maleic anhydride is detected when the resin forming the heat-sealable resin layer 41 is analyzed by infrared spectroscopy. For example, when a maleic anhydride-modified polyolefin is measured by infrared spectroscopy, peaks derived from maleic anhydride are detected near wavenumbers of 1760 $cm^{-1}$ and 1780 $cm^{-1}$. When the heat-sealable resin layer 41 is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

Specific examples of the polyolefin include polyethylenes such as low-density polyethylene, medium-density polyethylene, high-density polyethylene and linear low-density polyethylene; ethylene-α-olefin copolymers; polypropylene such as homopolypropylene, block copolymers of polypropylene (e.g., block copolymers of propylene and ethylene) and random copolymers of polypropylene (e.g., random copolymers of propylene and ethylene); propylene-α-olefin copolymers; and terpolymers of ethylene-butene-propylene. Of these, polypropylene is preferable. The polyolefin resin in the case of a copolymer may be a block copolymer or a random copolymer. These polyolefin-based resins may be used alone, or may be used in combination of two or more thereof.

The polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene; cyclic dienes such as cyclopentadiene, dicyclopentadiene, cyclohexadiene and norbornadiene. Among these polyolefins, cyclic alkenes are preferable, and norbornene is more preferable.

The acid-modified polyolefin is a polymer with the polyolefin modified by subjecting the polyolefin to block polymerization or graft polymerization with an acid component. As the polyolefin to be acid-modified, the above-mentioned polyolefins, copolymers obtained by copolymerizing polar molecules such as acrylic acid or methacrylic acid with the above-mentioned polyolefins, polymers such as crosslinked polyolefins, or the like can also be used. Examples of the acid component to be used for acid modification include carboxylic acids such as maleic acid, acrylic acid, itaconic acid, crotonic acid, maleic anhydride and itaconic anhydride, and anhydrides thereof.

The acid-modified polyolefin may be an acid-modified cyclic polyolefin. The acid-modified cyclic polyolefin is a polymer obtained by copolymerizing a part of monomers forming the cyclic polyolefin in place of an acid component, or block-polymerizing or graft-polymerizing an acid component with the cyclic polyolefin. The cyclic polyolefin to be modified with an acid is the same as described above. The acid component to be used for acid modification is the same as the acid component used for modification of the polyolefin.

Examples of preferred acid-modified polyolefins include polyolefins modified with a carboxylic acid or an anhydride thereof, polypropylene modified with a carboxylic acid or an anhydride thereof, maleic anhydride-modified polyolefins, and maleic anhydride-modified polypropylene.

The heat-sealable resin layer 41 may be formed from one resin alone, or may be formed from a blend polymer obtained by combining two or more resins. Further, the heat-sealable resin layer 41 may be composed of only one layer, or may be composed of two or more layers with the same resin component or different resin components.

As described above, the inner layer 4 may be a single layer, or may be a multiple layer. When the inner layer 4 is a multiple layer, at least one layer present in the inner layer 4 may contain a compound represented by general formula (A). When the inner layer 4 is a single layer, the heat-sealable resin layer 41 contains a compound represented by general formula (A). Since the heat-sealable resin layer 41 contains a compound represented by general formula (A), a resin for forming the heat-sealable resin layer 41 can be heated to a higher temperature than before (e.g. 300° C. or higher) to form the layer to shorten the lead time. The heat-sealable resin layer 41 is inhibited from being degraded by a high temperature, and thus can exhibit high insulation quality. The heat-sealable resin layer 41 may be a single layer or a multiple layer. When the heat-sealable resin layer 41 is a multiple layer, at least one layer may contain a compound represented by general formula (A).

When the heat-sealable resin layer 41 contains a compound represented by general formula (A), the content ratio of the compound is preferably about 0.01 mass % or more, more preferably about 0.03% or more, still more preferably about 0.05 mass % or more, from the viewpoint of more suitably exhibiting the effects of the present disclosure. The content ratio is preferably about 2 mass % or less, more preferably about 1 mass % or less, still more preferably about 0.5 mass % or less. The content ratio is preferably in the range of about 0.01 to 2 mass %, about 0.01 to 1 mass %, about 0.01 to 0.5 mass %, about 0.03 to 2 mass %, about 0.03 to 1 mass %, or about 0.03 to 0.5 mass %.

It is preferable that the heat-sealable resin layer 41 further contains at least one selected from the group consisting of the phosphorus-based antioxidant different from a compound represented by general formula (A), a phenol-based antioxidant, and a bifunctional processing stabilizer. It is preferable that each of the antioxidant and the processing stabilizer is contained in a layer containing the compound of the heat-sealable resin layer 41 which is represented by general formula (A).

Specific examples of the preferred combination of the antioxidant and the processing stabilizer contained in the heat-sealable resin layer 41 include an aspect in which the heat-sealable resin layer 41 contains a compound represented by general formula (A) and a phenol-based antioxidant, an aspect in which the heat-sealable resin layer 41 contains a compound represented by general formula (A), a phenol-based antioxidant and a bifunctional processing stabilizer, and an aspect in which the heat-sealable resin layer 41 contains a compound represented by general formula (A), a phosphorus-based antioxidant different from a compound represented by general formula (A), a phenol-based antioxidant, and a bifunctional processing stabilizer. Among these aspects, an aspect in which the heat-sealable resin layer 41 contains a compound represented by general formula (A), a phenol-based antioxidant and a bifunctional processing stabilizer, and an aspect in which the heat-sealable resin layer 41 contains a compound represented by general formula (A), a phosphorus-based antioxidant different from a compound represented by general formula (A), a phenol-based antioxidant, and a bifunctional processing stabilizer are particularly preferable.

When the heat-sealable resin layer 41 contains the phosphorus-based antioxidant, the content ratio of the phosphorus-based antioxidant in a layer containing a phosphorus-based antioxidant different from a compound represented by general formula (A) in the heat-sealable resin layer 41 is not particularly limited as long as the aforementioned effects of the present disclosure are exhibited, and the content ratio is preferably about 0.01 mass % or more, more preferably about 0.03 mass % or more, from the viewpoint of more suitably exhibiting the effects of the present disclosure. The content ratio is preferably about 1 mass % or less, more preferably about 0.5 mass % or less, still more preferably about 0.3 mass % or less. The content ratio is preferably in the range of about 0.01 to 1 mass %, about 0.01 to 0.5 mass %, about 0.01 to 0.3 mass %, about 0.03 to 1 mass %, about 0.03 to 0.5 mass %, or about 0.03 to 0.3 mass %.

When the heat-sealable resin layer 41 contains the phenol-based antioxidant, the content ratio of the phenol-based antioxidant in a layer containing the phenol-based antioxidant in the heat-sealable resin layer 41 is not particularly limited as long as the aforementioned effects of the present disclosure are exhibited, and the content ratio is preferably about 0.01 mass % or more, more preferably about 0.03 mass % or more, from the viewpoint of more suitably exhibiting the effects of the present disclosure. The content ratio is preferably about 0.5 mass % or less, more preferably about 0.3 mass % or less, still more preferably about 0.2 mass % or less. The content ratio is preferably in the range of about 0.01 to 0.5 mass %, about 0.01 to 0.3 mass %, about 0.01 to 0.2 mass %, about 0.03 to 0.5 mass %, about 0.03 to 0.3 mass %, or about 0.03 to 0.2 mass %.

When the heat-sealable resin layer 41 contains the bifunctional processing stabilizer, the content ratio of the bifunctional processing stabilizer in a layer containing the bifunctional processing stabilizer in the heat-sealable resin layer 41 is not particularly limited as long as the aforementioned effects of the present disclosure are exhibited, and the content ratio is preferably about 0.01 mass % or more, more preferably about 0.03 mass % or more, from the viewpoint of more suitably exhibiting the effects of the present disclosure. The content ratio is preferably about 0.5 mass % or less, more preferably about 0.3 mass % or less, still more preferably about 0.2 mass % or less. The content ratio is preferably in the range of about 0.01 to 0.5 mass %, about 0.01 to 0.3 mass %, about 0.01 to 0.2 mass %, about 0.03 to 0.5 mass %, about 0.03 to 0.3 mass %, or about 0.03 to 0.2 mass %.

The heat-sealable resin layer 41 may contain a slipping agent etc. if necessary. When the heat-sealable resin layer 41 contains a slipping agent, the moldability of the exterior material for electrical storage devices can be improved. The slipping agent is not particularly limited, and a known slipping agent can be used. The slipping agents may be used alone, or may be used in combination of two or more thereof.

The slipping agent is not particularly limited, and is preferably an amide-based slipping agent. Specific examples of the slipping agent include those exemplified for the base material layer 1. The slipping agents may be used alone, or may be used in combination of two or more thereof.

When a slipping agent is present on the surface of the heat-sealable resin layer 41, the amount of the slipping agent present is not particularly limited, and is preferably about 10 to 50 mg/m$^2$, more preferably about 15 to 40 mg/m$^2$ from the viewpoint of improving the moldability of the exterior material for electrical storage devices.

The slipping agent present on the surface of the heat-sealable resin layer 41 may be one obtained by exuding the slipping agent contained in the resin forming the heat-sealable resin layer 41, or one obtained by applying a slipping agent to the surface of the heat-sealable resin layer 41.

The thickness of the heat-sealable resin layer 41 is not particularly limited as long as the heat-sealable resin layers are heat-sealed to each other to perform a function of sealing the electrical storage device element, and the thickness is, for example, about 100 μm or less, preferably about 85 μm or less, more preferably about 15 to 85 μm. For example, when the thickness of the adhesive layer 42 described later is 10 μm or more, the thickness of the heat-sealable resin layer 41 is preferably about 85 μm or less, more preferably about 15 to 45 μm. For example, when the thickness of the adhesive layer 42 described later is less than 10 μm or the adhesive layer 42 is not provided, the thickness of the heat-sealable resin layer 41 is preferably about 20 μm or more, more preferably about 35 to 85 μm.

Adhesive Layer 42

In the exterior material for electrical storage devices according to the present disclosure, the adhesive layer 42 is a layer provided between the barrier layer 3 (or corrosion-resistant film) and the heat-sealable resin layer 41 if necessary for firmly bonding these layers to each other.

The adhesive layer 42 is formed from a resin capable of bonding the barrier layer 3 and the heat-sealable resin layer 41 to each other. As the resin to be used for forming the adhesive layer 42, for example, the same resin as exemplified for the heat-sealable resin layer 41 can be used. From the viewpoint of firmly bonding the adhesive layer 42 to the heat-sealable resin layer 41, it is preferable that the resin to be used for forming the adhesive layer 42 contains a polyolefin backbone. Examples thereof include the polyolefins and acid-modified polyolefins exemplified for the heat-sealable resin layer 41 described above. On the other hand, from the viewpoint of firmly bonding the barrier layer 3 and the adhesive layer 42 to each other, it is preferable that the adhesive layer 42 contains an acid-modified polyolefin. Examples of the acid modifying component include dicarboxylic acids such as maleic acid, itaconic acid, succinic acid and adipic acid, anhydrides thereof, acrylic acid, and methacrylic acid, and maleic anhydride is most preferable from the viewpoint of ease of modification, general-purpose property, and the like. From the viewpoint of the heat resistance of the exterior material for electrical storage devices, the olefin component is preferably a polypropylene-based resin, and it is most preferable that the adhesive layer 42 contains maleic anhydride-modified polypropylene.

The resin forming the adhesive layer 42 can be confirmed to contain a polyolefin backbone by an analysis method such as infrared spectroscopy, gas chromatography-mass spectrometry, and the analysis method is not particularly limited. The resin forming the adhesive layer 42 is confirmed to contain an acid-modified polyolefin, for example, when peaks derived from maleic anhydride are detected near wavenumbers of 1760 cm$^{-1}$ and 1780 cm$^{-1}$ when a maleic anhydride-modified polyolefin is measured by infrared spectroscopy. However, if the degree of acid modification is low, the peaks may be too small to be detected. In that case, the peaks can be analyzed by nuclear magnetic resonance spectroscopy.

Since the adhesive layer 42 contains a compound represented by general formula (A), a resin for forming the adhesive layer 42 can be heated to a higher temperature than before (e.g. 300° C. or higher) to form the layer to shorten the lead time. The adhesive layer 42 is inhibited from being degraded by a high temperature, and thus can exhibit high insulation quality.

When the adhesive layer 42 contains a compound represented by general formula (A), the content ratio of the compound is preferably about 0.01 mass % or more, more preferably about 0.03% or more, still more preferably about 0.05 mass % or more, from the viewpoint of more suitably exhibiting the effects of the present disclosure. The content ratio is preferably about 2 mass % or less, more preferably about 1 mass % or less, still more preferably about 0.5 mass % or less. The content ratio is preferably in the range of about 0.01 to 2 mass %, about 0.01 to 1 mass %, about 0.01 to 0.5 mass %, about 0.03 to 2 mass %, about 0.03 to 1 mass %, or about 0.03 to 0.5 mass %.

When the adhesive layer 42 contains a compound represented by general formula (A), the content ratio of the compound in the adhesive layer 42 is preferably higher than the content ratio of the compound in the heat-sealable resin layer 41. This is because the adhesive layer 42 closer to a surface contacting a metal plate at a high temperature is inhibited from being degraded during heat-sealing of the exterior material for electrical storage devices, so that further excellent insulation quality can be exhibited.

It is preferable that the adhesive layer 42 further contains at least one selected from the group consisting of the phosphorus-based antioxidant different from a compound represented by general formula (A), a phenol-based antioxidant, and a bifunctional processing stabilizer. It is preferable that each of the antioxidant and the processing stabilizer is contained in a layer containing the compound of the adhesive layer 42 which is represented by general formula (A).

Specific examples of the preferred combination of the antioxidant and the bifunctional processing stabilizer contained in the adhesive layer 42 include an aspect in which the adhesive layer 42 contains a compound represented by general formula (A) and a phenol-based antioxidant, an aspect in which the heat-sealable resin layer 41 contains a compound represented by general formula (A), a phenol-based antioxidant and a bifunctional processing stabilizer, and an aspect in which the adhesive layer 42 contains a compound represented by general formula (A), a phosphorus-based antioxidant different from a compound represented by general formula (A), a phenol-based antioxidant, and a bifunctional processing stabilizer. Among these aspects, an aspect in which the adhesive layer 42 contains a compound represented by general formula (A), a phenol-based antioxidant and a bifunctional processing stabilizer, and an aspect in which the adhesive layer 42 contains a compound represented by general formula (A), a phosphorus-based antioxidant different from a compound represented by general formula (A), a phenol-based antioxidant, and a bifunctional processing stabilizer are particularly preferable.

When the adhesive layer 42 contains the phosphorus-based antioxidant, the content ratio of the phosphorus-based antioxidant in a layer containing a phosphorus-based antioxidant different from a compound represented by general formula (A) in the adhesive layer 42 is not particularly limited as long as the aforementioned effects of the present disclosure are exhibited, and the content ratio is preferably about 0.01 mass % or more, more preferably about 0.03 mass % or more, from the viewpoint of more suitably exhibiting the effects of the present disclosure. The content ratio is preferably about 1 mass % or less, more preferably about 0.5 mass % or less, still more preferably about 0.3 mass % or less. The content ratio is preferably in the range of about 0.01 to 1 mass %, about 0.01 to 0.5 mass %, about 0.01 to 0.3 mass %, about 0.03 to 1 mass %, about 0.03 to 0.5 mass %, or about 0.03 to 0.3 mass %.

When the adhesive layer 42 contains the phenol-based antioxidant, the content ratio of the phenol-based antioxidant in a layer containing the phenol-based antioxidant in the adhesive layer 42 is not particularly limited as long as the aforementioned effects of the present disclosure are exhibited, and the content ratio is preferably about 0.01 mass % or more, more preferably above about 0.03 mass %, from the viewpoint of more suitably exhibiting the effects of the present disclosure. The content ratio is preferably about 0.5 mass % or less, more preferably about 0.3 mass % or less, still more preferably about 0.2 mass % or less. The content ratio is preferably in the range of about 0.01 to 0.5 mass %, about 0.01 to 0.3 mass %, about 0.01 to 0.2 mass %, about 0.03 to 0.5 mass %, about 0.03 to 0.3 mass %, or about 0.03 to 0.2 mass %.

When the adhesive layer 42 contains the bifunctional processing stabilizer, the content ratio of the bifunctional processing stabilizer in a layer containing the bifunctional processing stabilizer in the adhesive layer 42 is not particularly limited as long as the aforementioned effects of the present disclosure are exhibited, and the content ratio is preferably about 0.01 mass % or more, more preferably about 0.03 mass % or more, from the viewpoint of more suitably exhibiting the effects of the present disclosure. The content ratio is preferably about 0.5 mass % or less, more preferably about 0.3 mass % or less, still more preferably about 0.2 mass % or less. The content ratio is preferably in the range of about 0.01 to 0.5 mass %, about 0.01 to 0.3 mass %, about 0.01 to 0.2 mass %, about 0.03 to 0.5 mass %, about 0.03 to 0.3 mass %, or about 0.03 to 0.2 mass %.

The thickness of the adhesive layer 42 is preferably about 50 µm or less, about 40 µm or less, about 30 µm or less, about 20 µm or less, or about 5 µm or less. The thickness of the adhesive layer 42 is preferably about 0.1 µm or more, or about 0.5 µm or more. The thickness of the adhesive layer 42 is preferably in the range of about 0.1 to 50 µm, about 0.1 to 40 µm, about 0.1 to 30 µm, about 0.1 to 20 µm, about 0.1 to 5 µm, about 0.5 to 50 µm, about 0.5 to 40 µm, about 0.5 to 30 µm, about 0.5 to 20 µm, or about 0.5 to 5 µm. More specifically, the thickness is preferably about 1 to 10 µm, more preferably about 1 to 5 µm in the case of the adhesive exemplified for the adhesive agent layer 2 or a cured product of an acid-modified polyolefin with a curing agent. When any of the resins exemplified for the heat-sealable resin layer 41 is used, the thickness of the adhesive layer is preferably about 2 to 50 µm, more preferably about 10 to 40 µm. When the adhesive layer 42 is a cured product of a resin composition containing the adhesive exemplified for the adhesive agent layer 2 or an acid-modified polyolefin and a curing agent, the adhesive layer 42 can be formed by, for example, applying the resin composition and curing the resin composition by heating or the like. When the resin exemplified for the heat-sealable resin layer 41 is used, for example, extrusion molding of the heat-sealable resin layer 41 and the adhesive layer 42 can be performed.

Surface Coating Layer 6

The exterior material for electrical storage devices according to the present disclosure may include a surface coating layer 6 on the base material layer 1 (on a side opposite to the barrier layer 3 from the base material layer 1) if necessary for the purpose of improving at least one of designability, electrolytic solution resistance, scratch resistance, moldability and the like. The surface coating layer 6 is a layer located on the outermost layer side of the exterior material for electrical storage devices when the power storage device is constructed using the exterior material for electrical storage devices.

The surface coating layer 6 can be formed from, for example, a resin such as polyvinylidene chloride, polyester, polyurethane, acrylic resin or epoxy resin.

When the resin forming the surface coating layer 6 is a curable resin, the resin may be any of a one-liquid curable type and a two-liquid curable type, and is preferably a two-liquid curable type. Examples of the two-liquid curable resin include two-liquid curable polyurethane, two-liquid curable polyester and two-liquid curable epoxy resins. Of these, two-liquid curable polyurethane is preferable.

Examples of the two-liquid curable polyurethane include polyurethane which contains a first component containing a polyol compound and a second component containing an isocyanate compound. The polyurethane is preferably a two-liquid curable polyurethane adhesive having polyol such as polyester polyol, polyether polyol or acrylic polyol as a first component, and aromatic or aliphatic polyisocyanate as a second component. Examples of the polyurethane include polyurethane containing an isocyanate compound and a polyurethane compound obtained by reacting a polyol compound with an isocyanate compound in advance. Examples of the polyurethane include polyurethane containing a polyurethane compound and a polyurethane compound obtained by reacting a polyol compound with an isocyanate compound in advance. Examples of the polyurethane include polyurethane obtained by reacting a polyol compound with an isocyanate compound to form a polyurethane compound in advance, and reacting the polyurethane compound with moisture in the air or the like. It is preferable that polyester polyol having a hydroxyl group in the side chain in addition to a hydroxyl group at the end of the repeating unit is used as the polyol compound. Examples of the second component include aliphatic, alicyclic, aromatic and araliphatic isocyanate-based compounds. Examples of the isocyanate-based compound include hexamethylene diisocyanate (HDI), xylylene diisocyanate (XDI), isophorone diisocyanate (IPDI), hydrogenated XDI (H6XDI), hydrogenated MDI (H 12 MDI), tolylene diisocyanate (TDI), diphenylmethane diisocyanate (MDI) and naphthalene diisocyanate (NDI). Examples of the isocyanate-based compound also include polyfunctional isocyanate-modified products of one or more of these diisocyanates can be mentioned. It is also possible to use a multimer (e.g. a trimer) as the polyisocyanate compound. Examples of the multimer include adducts, biurets, and nurates. The aliphatic isocyanate-based compound is an isocyanate having an aliphatic group and having no aromatic ring, the alicyclic isocyanate-based compound is an isocyanate having an alicyclic hydrocarbon group, and the aromatic isocyanate-based compound is an isocyanate having an aromatic ring. Since the surface coating layer 6 is formed of polyurethane, excellent electrolytic solution resistance is imparted to the exterior material for electrical storage devices.

If necessary, the surface coating layer 6 may contain additives such as the slipping agent, an anti-blocking agent, a matting agent, a flame retardant, an antioxidant, a tackifier and an anti-static agent on at least one of the surface and the inside of the surface coating layer 6 according to the functionality and the like to be imparted to the surface coating layer 6 and the surface thereof. The additives are in the form of, for example, fine particles having an average particle diameter of about 0.5 nm to 5 μm. The average particle diameter of the additives is a median diameter measured by a laser diffraction/scattering particle size distribution measuring apparatus.

The additives may be either inorganic substances or organic substances. The shape of the additive is not particularly limited, and examples thereof include a spherical shape, a fibrous shape, a plate shape, an amorphous shape and a scaly shape.

Specific examples of the additives include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, acrylate resins, crosslinked acryl, crosslinked styrene, crosslinked polyethylene, benzoguanamine, gold, aluminum, copper and nickel. The additives may be used alone, or may be used in combination of two or more thereof. Of these additives, silica, barium sulfate and titanium oxide are preferable from the viewpoint of dispersion stability, costs, and so on. The surface of the additive may be subjected to various kinds of surface treatments such as insulation treatment and dispersibility enhancing treatment.

The method for forming the surface coating layer 6 is not particularly limited, and examples thereof include a method in which a resin for forming the surface coating layer 6 is applied. When the additive is added to the surface coating layer 6, a resin mixed with the additive may be applied.

The thickness of the surface coating layer 6 is not particularly limited as long as the above-mentioned function as the surface coating layer 6 is performed, and it is, for example, about 0.5 to 10 μm, preferably about 1 to 5 μm.

3. Method for Manufacturing Exterior Material for Electrical Storage Devices

The method for producing an exterior material for electrical storage devices is not particularly limited as long as a laminate is obtained in which the layers of the power storage device outer packaging material of the present invention are laminated. Examples thereof include a method including the step of laminating at least the base material layer 1, the barrier layer 3 and the inner layer 4 in this order.

An example of the method for manufacturing the exterior material for electrical storage devices of the present invention is as follows. First, a laminate including the base material layer 1, the adhesive agent layer 2 and the barrier layer 3 in this order (hereinafter, the laminate may be described as a "laminate A") is formed. Specifically, the laminate A can be formed by a dry lamination method in which an adhesive to be used for formation of the adhesive agent layer 2 is applied onto the base material layer 1 or the barrier layer 3, the surface of which is subjected to a chemical conversion treatment if necessary, using a coating method such as a gravure coating method or a roll coating method, and dried, the barrier layer 3 or the base material layer 1 is then laminated, and the adhesive agent layer 2 is cured.

Then, the inner layer 4 is laminated on the barrier layer 3 of the laminate A. When the heat-sealable resin layer 41 is laminated directly on the barrier layer 3, the heat-sealable resin layer 41 may be laminated onto the barrier layer 3 of the laminate A by a method such as a thermal lamination method or an extrusion lamination method. When the adhesive layer 42 is provided between the barrier layer 3 and the heat-sealable resin layer 41, mention is made of, for example, (1) a method in which the adhesive layer 42 and the heat-sealable resin layer 41 are extruded to be laminated on the barrier layer 3 of the laminate A (extrusion lamination method or tandem lamination method); (2) a method in which the adhesive layer 42 and the heat-sealable resin layer 41 are laminated to form a laminate separately, and the laminate is laminated on the barrier layer 3 of the laminate A by a thermal lamination method, or a method in which a laminate with the adhesive layer 42 laminated on the barrier layer 3 of the laminate A is formed, and laminated to the heat-sealable resin layer 41 by a thermal lamination method; (3) a method in which the melted adhesive layer 42 is poured between the barrier layer 3 of the laminate A and the heat-sealable resin layer 41 formed in a sheet shape beforehand, and simultaneously the laminate A and the heat-sealable resin layer 41 are bonded together with the adhesive layer 42 interposed therebetween (sandwich lamination); and (4) an adhesive for forming the adhesive layer 42 is applied by solution coating and dried or baked to laminate the adhesive on the barrier layer 3 of the laminate A, and the heat-sealable resin layer 41 formed in a sheet shape in advance is laminated on the adhesive layer 42.

When the surface coating layer 6 is provided, the surface coating layer 6 is laminated on a surface of the base material layer 1 on a side opposite to the barrier layer 3. The surface coating layer 6 can be formed by, for example, coating a surface of the base material layer 1 with the resin that forms the surface coating layer 6. The order of the step of laminating the barrier layer 3 on a surface of the base material layer 1 and the step of laminating the surface coating layer 6 on a surface of the base material layer 1 is not particularly limited. For example, the surface coating layer 6 may be formed on a surface of the base material layer 1, followed by forming the barrier layer 3 on a surface of the base material layer 1 on a side opposite to the surface coating layer 6.

As described above, a laminate including the surface coating layer 6 provided if necessary, the base material layer 1, the adhesive agent layer 2 provided if necessary, the barrier layer 3, and the inner layer 4 in this order is formed, and the laminate may be further subjected to heating treatment for strengthening the bondability of the adhesive agent layer 2 provided if necessary and the adhesive layer 42.

In the exterior material for electrical storage devices, the layers forming the laminate may be subjected to surface activation treatment such as corona treatment, blast treatment, oxidation treatment or ozone treatment if necessary to improve processing suitability. For example, by subjecting a surface of the base material layer 1, which is opposite to the barrier layer 3, to a corona treatment, the ink printability of the surface of the base material layer 1 can be improved.

4. Uses of Exterior Material for Electrical Storage Devices

The exterior material for electrical storage devices according to the present disclosure is used as a packaging for hermetically sealing and storing electrical storage device elements such as a positive electrode, a negative electrode, and an electrolyte. That is, in a packaging formed of the exterior material for electrical storage devices, an electrical storage device element including at least a positive electrode, a negative electrode, and an electrolyte can be stored to obtain an electrical storage device.

Figure 5:
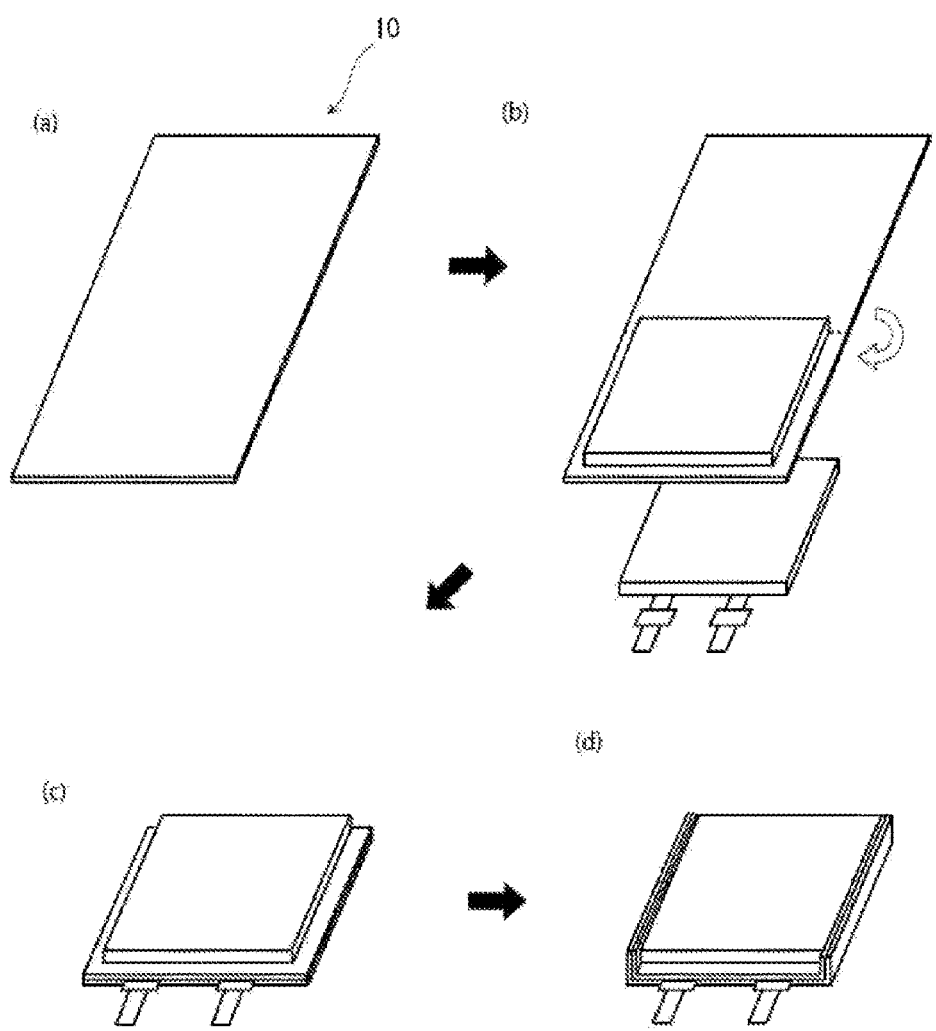
FIG. 5 is a schematic diagram for illustrating a method for housing an electrical storage device element in a packaging formed from an exterior material for electrical storage devices according to the present disclosure.

Specifically, an electrical storage device element including at least a positive electrode, a negative electrode, and an electrolyte is covered with the exterior material for electrical storage devices according to the present disclosure such that a flange portion (region where a heat-sealable resin layer is in contact with itself) can be formed on the periphery of the electrical storage device element while a metal terminal connected to each of the positive electrode and the negative electrode protrudes to the outside, and the heat-sealable resin layer at the flange portion is heat-sealed with itself, thereby providing an electrical storage device using the exterior material for electrical storage devices. When the electrical storage device element is stored in the packaging formed of the exterior material for electrical storage devices according to the present disclosure, the packaging is formed in such a manner that the heat-sealable resin portion of the exterior material for electrical storage devices according to the present disclosure is on the inner side (a surface contacting the electrical storage device element). The heat-sealable resin layers of two exterior materials for electrical storage devices may be superposed in such a manner as to face each other, followed by heat-sealing the peripheral edge portions of the superposed exterior materials for electrical storage devices to form a packaging. Alternatively, as in the example shown in FIG. 5, one exterior material for electrical storage devices may be folded over itself, followed by heat-sealing the peripheral edge portions to form a packaging. When the exterior material is folded over itself, a packaging may be formed by three-side sealing with the exterior material heat-sealed at sides other than the folding side as in the example shown in FIG. 5, or may be subjected to four-side sealing with the exterior material folded in such a manner that a flange portion can be formed. In the exterior material for electrical storage devices, a concave portion for housing an electrical storage device element may be formed by deep drawing molding or bulging molding. As in the example shown in FIG. 5, one exterior material for electrical storage devices may be provided with a concave portion while the other exterior material for electrical storage devices is not provided a concave portion, or the other exterior material for electrical storage devices may also be provided with a concave portion.

The exterior material for electrical storage devices according to the present disclosure can be suitably used for electrical storage devices such as batteries (including condensers, capacitors and the like). The exterior material for electrical storage devices according to the present disclosure may be used for either primary batteries or secondary batteries, and is preferably used for secondary batteries. The type of a secondary battery to which the exterior material for electrical storage devices according to the present disclosure is applied is not particularly limited, and examples thereof include lithium ion batteries, lithium ion polymer batteries, solid-state batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Of these secondary batteries, preferred subjects to which the exterior material for electrical storage devices according to the present disclosure is applied include lithium ion batteries and lithium ion polymer batteries.

EXAMPLES

Hereinafter, the present disclosure will be described in detail by way of examples and comparative examples. However, the present disclosure is not limited to examples.

Manufacturing of Exterior Material for Electrical Storage Devices

Examples 1 to 13 and Comparative Examples 1 and 2

For a base material layer, a polyethylene terephthalate (PET) film (thickness: 12 µm) and a stretched nylon (ONy) film (thickness: 15 µm) were provided. Using a two-liquid urethane adhesive (polyol compound and aromatic isocyanate-based compound), the PET film and the ONy film were bonded to each other with an adhesive agent layer interposed therebetween in such a manner that the thickness of the adhesive agent layer after curing was 3 µm. In addition, an aluminum foil (JIS H4160:1994 A8021 H-O (thickness: 40 µm)) was prepared as a barrier layer. Using a two-liquid urethane adhesive (polyol compound and aromatic isocyanate-based compound), the aluminum foil and the base material layer (ONy film side) were laminated by a dry lamination method in such a manner that the thickness of the adhesive agent layer after curing was 3 µm, and aging treatment was then performed to prepare a laminate of base material layer/adhesive agent layer/barrier layer. Both surfaces of the aluminum foil are subjected to chemical conversion treatment. The chemical conversion treatment of the aluminum foil was performed by applying to both the surfaces of the aluminum foil a treatment liquid including a phenol resin, a chromium fluoride compound and phosphoric acid using a roll coating method in such a manner that the application amount of chromium was 10 mg/m² (dry mass), and performing baking.

Next, an inner layer including an adhesive layer and a heat-sealable resin layer was laminated on the barrier layer of each laminate obtained as described above. Specifically, a maleic anhydride-modified polypropylene composition as an adhesive layer (thickness: 40 µm) and a random polypropylene composition as a heat-sealable resin layer (thickness: 40 µm) were melt-co-extruded at a higher-than-normal temperature of 310° C. to laminate the adhesive layer and the heat-sealable resin layer on the barrier layer, thereby obtaining an exterior material for electrical storage devices in which a base material layer (thickness: 30 µm including an adhesive), an adhesive agent layer (thickness: 3 µm), a barrier layer (thickness: 40 µm), an adhesive layer (thickness: 40 µm) and a heat-sealable resin layer (40 µm) were laminated in this order. Since the inner layer was melt-co-extruded at a higher-than-normal temperature, it was possible to form the inner layer in a short time, so that productivity of the exterior material for electrical storage devices was improved (lead time was shortened).

In Examples 1 to 13 and Comparative Examples 1 and 2, an antioxidant and a processing stabilizer as shown in Table 1 were blended in each of the maleic anhydride-modified polypropylene composition for forming the adhesive layer and the random polypropylene composition for forming the heat-sealable resin layer. Specific compounds for the antioxidant and the processing stabilizer are as follows.

Example 14

A laminate of base material layer/adhesive agent layer/barrier layer was prepared in the same manner as in Examples 1 to 13. Next, an inner layer including an adhesive layer and a heat-sealable resin layer was laminated on the barrier layer of the obtained laminate. Specifically, a maleic anhydride-modified polypropylene composition as an adhesive layer (thickness: 20 µm), a random polypropylene composition as a second heat-sealable resin layer (thickness: 30 µm) and a random polypropylene composition as a second heat-sealable resin layer (thickness: 20 µm) were melt-co-extruded at a higher-than-normal temperature of 310° C. to laminate the adhesive layer, the second heat-sealable resin layer and the first heat-sealable resin layer on the barrier layer, thereby obtaining an exterior material for electrical storage devices in which a base material layer (thickness: 30 µm including an adhesive), an adhesive agent layer (thickness: 3 µm), a barrier layer (thickness: 40 µm), an adhesive layer (thickness: 20 µm), a second heat-sealable resin layer (thickness: 30 µm) and a first heat-sealable resin layer (20 µm) were laminated in this order. Since the inner layer was melt-co-extruded at a higher-than-normal temperature, it was possible to form the inner layer in a short time, so that productivity of the exterior material for electrical storage devices was improved (lead time was shortened). In Example 14, an antioxidant and a processing stabilizer as shown in Table 1 were blended in the maleic anhydride-modified polypropylene composition for forming the adhesive layer and the random polypropylene composition for forming the heat-sealable resin layer (first heat-sealable resin layer and second heat-sealable resin layer).

Phosphorus-Based Antioxidant

A1: bis(2,4-dicumylphenyl)pentaerythritol diphosphite
A2: bis(2,6-di-t-butyl-4-methylphenyl)pentaerythritol diphosphite
B1: tris(2,4-di-t-butylphenoxy)phosphine Phenol-Based Antioxidant C1: tetrakis[methylene-3-(3,5-di-t-butyl-4-hydroxyphenyl) propionate]methane
C2: 1,3,5-tris[[3,5-bis(1,1-dimethylethyl)-4-hydroxyphenyl]methyl]-1,3,5-triazine-2,4,6(1H, 3H, 5H)-trione Bifunctional Processing Stabilizer D1: 1'-hydroxy[2,2'-ethylidenebis[4,6-bis(1,1-dimethylpropyl)benzene]]-1-yl acrylate

TABLE 1

| | Antioxidant/processing stabilizer contained in inner layer | |
|---|---|---|
| | Adhesive layer | Heat-sealable resin layer |
| Example 1 | Antioxidant A1 (0.5 mass %) | Antioxidant A1 (0.2 mass %) |
| Example 2 | Antioxidant A2 (0.5 mass %) | Antioxidant A2 (0.2 mass %) |
| Example 3 | Antioxidant A1 (0.3 mass %)<br>Antioxidant C1 (0.2 mass %) | Antioxidant A1 (0.1 mass %)<br>Antioxidant C1 (0.1 mass %) |
| Example 4 | Antioxidant A2 (0.3 mass %)<br>Antioxidant C1 (0.2 mass %) | Antioxidant A2 (0.1 mass %)<br>Antioxidant C1 (0.1 mass %) |
| Example 5 | Antioxidant A1 (0.3 mass %)<br>Processing stabilizer D1 (0.2 mass %) | Antioxidant A1 (0.2 mass %) |
| Example 6 | Antioxidant A1 (0.3 mass %)<br>Antioxidant B1 (0.1 mass %)<br>Antioxidant C1 (0.2 mass %) | Antioxidant B1 (0.1 mass %)<br>Antioxidant C1 (0.1 mass %) |
| Example 7 | Antioxidant A2 (0.3 mass %)<br>Antioxidant B1 (0.1 mass %)<br>Antioxidant C1 (0.2 mass %) | Antioxidant B1 (0.1 mass %)<br>Antioxidant C1 (0.1 mass %) |
| Example 8 | Antioxidant B1 (0.3 mass %)<br>Antioxidant C1 (0.2 mass %) | Antioxidant A1 (0.1 mass %)<br>Antioxidant B1 (0.1 mass %)<br>Antioxidant C1 (0.1 mass %) |
| Example 9 | Antioxidant B1 (0.3 mass %)<br>Antioxidant C1 (0.2 mass %) | Antioxidant A2 (0.1 mass %)<br>Antioxidant B1 (0.1 mass %)<br>Antioxidant C2 (0.1 mass %) |
| Example 10 | Antioxidant A1 (0.3 mass %)<br>Antioxidant C1 (0.1 mass %)<br>Processing stabilizer D1 (0.1 mass %) | Antioxidant A1 (0.1 mass %)<br>Antioxidant C1 (0.1 mass %) |

TABLE 1-continued

| | Antioxidant/processing stabilizer contained in inner layer | |
|---|---|---|
| | Adhesive layer | Heat-sealable resin layer |
| Example 11 | Antioxidant A2 (0.3 mass %)<br>Antioxidant C1 (0.1 mass %)<br>Processing stabilizer D1 (0.1 mass %) | Antioxidant A2 (0.1 mass %)<br>Antioxidant C1 (0.1 mass %) |
| Example 12 | Antioxidant A1 (0.3 mass %)<br>Antioxidant B1 (0.1 mass %)<br>Antioxidant C1 (0.1 mass %)<br>Processing stabilizer D1 (0.1 mass %) | Antioxidant B1 (0.1 mass %)<br>Antioxidant C1 (0.1 mass %) |
| Example 13 | Antioxidant B1 (0.3 mass %)<br>Antioxidant C1 (0.2 mass %) | Antioxidant A1 (0.1 mass %)<br>Antioxidant B1 (0.1 mass %)<br>Antioxidant C1 (0.1 mass %)<br>Processing stabilizer D1 (0.1 mass %) |
| Example 14 | Antioxidant A1 (0.3 mass %)<br>Antioxidant B1 (0.1 mass %)<br>Antioxidant C1 (0.1 mass %)<br>Processing stabilizer D1 (0.1 mass %) | Antioxidant B1 (0.1 mass %)<br>Antioxidant C1 (0.1 mass %) |
| Comparative Example 1 | Antioxidant B1 (0.3 mass %)<br>Antioxidant C1 (0.2 mass %) | Antioxidant B1 (0.1 mass %)<br>Antioxidant C1 (0.1 mass %) |
| Comparative Example 2 | Antioxidant B1 (0.3 mass %)<br>Antioxidant C1 (0.1 mass %)<br>Processing stabilizer D1 (0.1 mass %) | Antioxidant B1 (0.1 mass %)<br>Antioxidant C1 (0.1 mass %) |

Evaluation of Insulation Quality

The insulation quality of the exterior materials for electrical storage devices which had been obtained in examples and comparative examples were evaluated by measurement of the residual ratio of the thickness of the inner layer after heat-sealing and a wire short-circuit test. Table 2 shows the results.

Measurement of Residual Ratio of Thickness of Inner Layer after Heat-Sealing

The exterior material for electrical storage devices was cut to 150 mm (length)×60 mm (width) to prepare a test sample. Next, the heat-sealable resin layers of the test sample were opposed to each other. Next, in this state, the test sample was heated and pressed from both sides in the lamination direction under the conditions of a temperature of 190° C., a surface pressure of 1 MPa, and a time of 3 seconds with the use of a 7 mm-wide metal plate to heat-seal the heat-sealable resin layers to each other. The thickness of the inner layer after heat-sealing (total thickness of adhesive layer and heat-sealable resin layer) was measured, and the ratio of the measured thickness to the thickness of the inner layer before heat-sealing (100%).

Wire Short-Circuit Test

Figure 6:
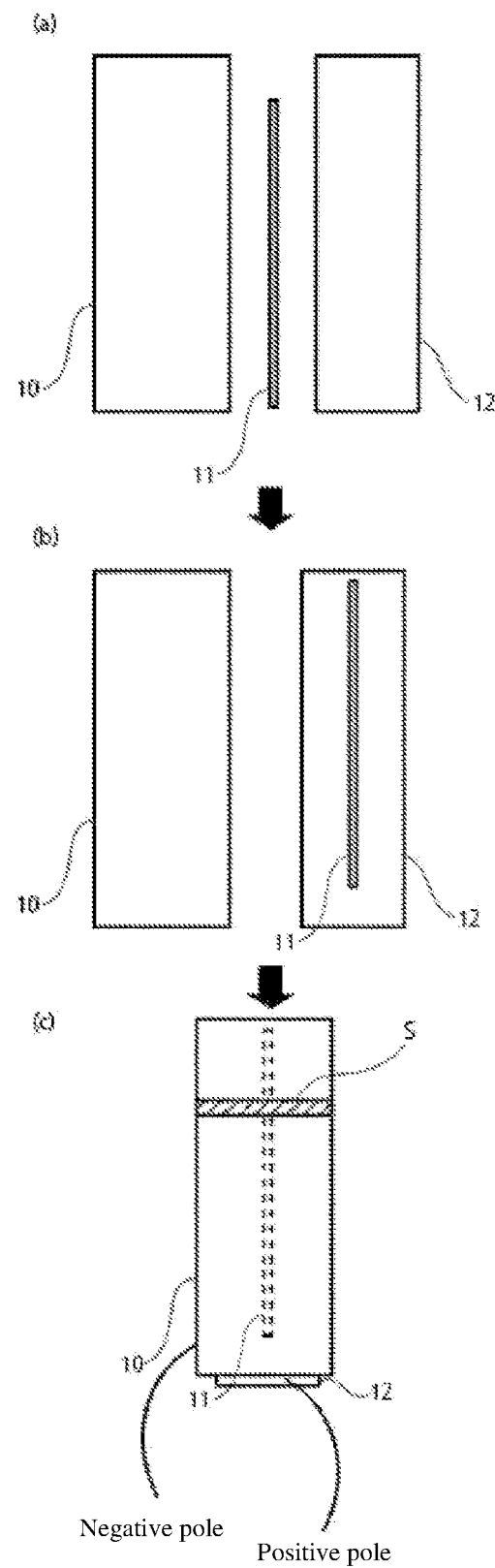
FIG. 6 is a diagram for illustrating a method for evaluating the insulation quality of an exterior material for electrical storage devices.

As shown in FIG. 6, each of the obtained exterior materials for electrical storage devices was cut to prepare a strip piece having a width of 40 mm and a length of 100 mm, and the strip piece was used as a test sample (exterior material 10 for electrical storage devices) (FIG. 6(a)). On the other hand, a stainless wire 11 having a diameter of 25 μm and a length of 70 mm was disposed at the center in the width direction of an aluminum sheet 12 having a width of 30 mm, a length of 100 mm and a thickness of 100 μm (FIG. 6(b)). Next, the heat-sealable resin layer side of the test sample and the wire 11 side of the aluminum sheet 12 were arranged to be opposed to each other (FIG. 6(c)). At this time, the center of the test sample in the width direction and the center of the aluminum sheet 12 in the width direction were made to coincide with each other. Next, the positive pole and the negative pole of a tester were connected to the aluminum sheet 12 and the test sample, respectively. For the negative pole of the tester, a crocodile clip was inserted so as to reach the barrier layer from the base material layer side of the test sample, so that the negative pole of the tester and the barrier layer were electrically connected. The tester was prepared so as to generate a conduction (short-circuit) signal at the time when the applied voltage was 100 V or less, and the resistance was 200 MΩ or less. Next, a voltage of 100 V was applied between the testers, and with the stainless steel wire 11 interposed between the aluminum sheet 12 and the test sample, heat sealing was performed in a direction orthogonal to the wire at 190° C. and 1 MPa over a width of 7 mm (the shaded area in FIG. 6(c) is a heat sealing portion S), and a time until generation of a short-circuit signal was measured. The measurement was performed five times, and an average value of three results left after exclusion of the longest time and the shortest time was adopted.

TABLE 2

| | Evaluation of insulation quality of exterior material for electrical storage devices | |
|---|---|---|
| | Residual ratio of thickness of inner layer after heat-sealing (%) | Wire short-circuit test (time until short-circuit (sec)) |
| Example 1 | 58 | 26 |
| Example 2 | 57 | 25 |
| Example 3 | 60 | 28 |
| Example 4 | 58 | 26 |
| Example 5 | 61 | 30 |

TABLE 2-continued

| | Evaluation of insulation quality of exterior material for electrical storage devices | |
|---|---|---|
| | Residual ratio of thickness of inner layer after heat-sealing (%) | Wire short-circuit test (time until short-circuit (sec)) |
| Example 6 | 60 | 28 |
| Example 7 | 58 | 26 |
| Example 8 | 56 | 23 |
| Example 9 | 55 | 23 |
| Example 10 | 63 | 32 |
| Example 11 | 61 | 30 |
| Example 12 | 64 | 33 |
| Example 13 | 56 | 24 |
| Example 14 | 60 | 30 |
| Comparative Example 1 | 49 | 14 |
| Comparative Example 2 | 51 | 16 |

The inner layer of the exterior material for electrical storage devices in each of Examples 1 to 14 contains an antioxidant including a compound represented by general formula (A). The exterior material for electrical storage devices in each of Examples 1 to 14 exhibits excellent insulation quality although a resin for forming the inner layer was melted at a high temperature of 310° C. to form the inner layer.

As described above, the present disclosure provides the invention of aspects as shown below.

Item 1. An exterior material for electrical storage devices including a laminate including at least a base material layer, a barrier layer and an inner layer in this order from the outside, the inner layer containing a compound represented by the following general formula (A):

[Chemical Formula 11]

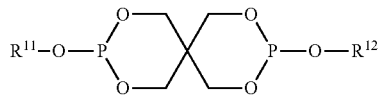

(A)

wherein $R^{11}$ and $R^{12}$ each independently represent an alkyl group having 1 to 18 carbon atoms, or a phenyl group optionally having a substituent.

Item 2. The exterior material for electrical storage devices according to item 1, in which in general formula (A), the phenyl group has, as a substituent, at least one group selected from the group consisting of an alkyl group having 1 to 9 carbon atoms, a cycloalkyl group having 5 to 8 carbon atoms, an alkylcycloalkyl group having 6 to 12 carbon atoms, and an aralkyl group having 7 to 12 carbon atoms.

Item 3. The exterior material for electrical storage devices according to item 1 or 2, in which the compound represented by general formula (A) is at least one of a compound represented by the following formula (A') and a compound represented by the following formula (A"):

[Chemical Formula 12]

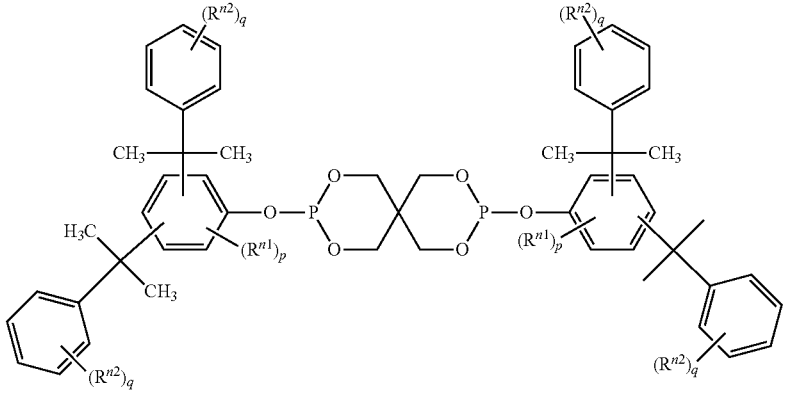

(A')

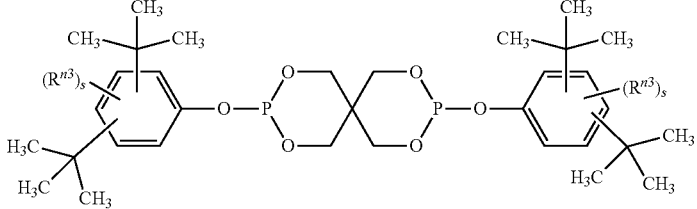

(A")

wherein in general formula (A'), $R^{n1}$ and $R^{n2}$ each independently represent a substituent other than a hydrogen atom, each p independently represents an integer of 0 to 3, and each q independently represents an integer of 0 to 5; and in general formula (A"), each $R^{n3}$ independently represents an alkyl group having 1 to 9 carbon atoms, and each s independently represents an integer of 0 to 3.

Item 4. The exterior material for electrical storage devices according to item 1 or 2, in which the compound represented by general formula (A) is at least one of a compound represented by the following formula (A1) and a compound represented by the following formula (A2):

[Chemical Formula 13]

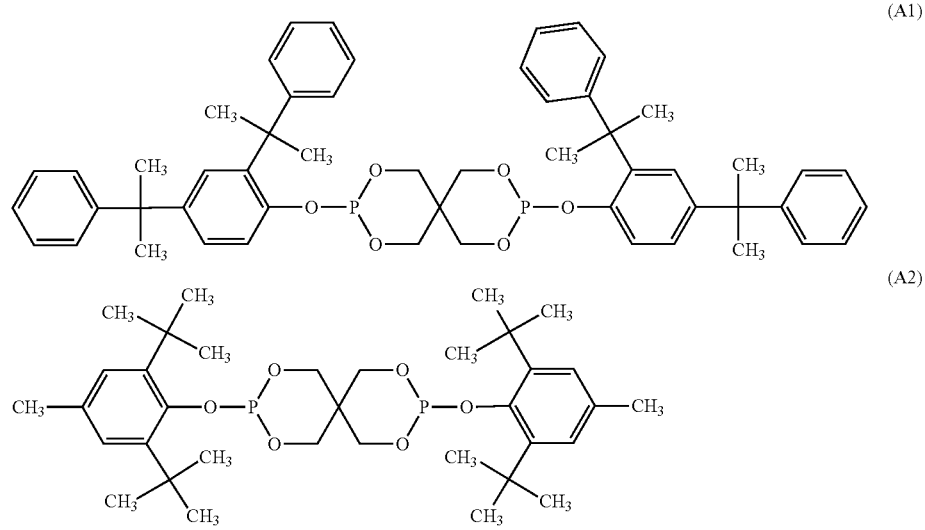

Item 5. The exterior material for electrical storage devices according to any one of items 1 to 4, in which the inner layer includes an adhesive layer and a heat-sealable resin layer in this order from the barrier layer side, and at least one of the adhesive layer and the heat-sealable resin layer contains a compound represented by general formula (A).

Item 6. The exterior material for electrical storage devices according to any one of items 1 to 5, in which the inner layer further contains at least one selected from the group consisting of the phosphorus-based antioxidant different from a compound represented by general formula (A), a phenol-based antioxidant, and a bifunctional processing stabilizer.

Item 7. The exterior material for electrical storage devices according to any one of items 1 to 5, in which the bifunctional processing stabilizer contains a compound having an acrylate group and a phenolic hydroxyl group in one molecule.

Item 8. The exterior material for electrical storage devices according to any one of items 1 to 7, in which the bifunctional processing stabilizer contains a compound represented by the following general formula (B):

[Chemical Formula 14]

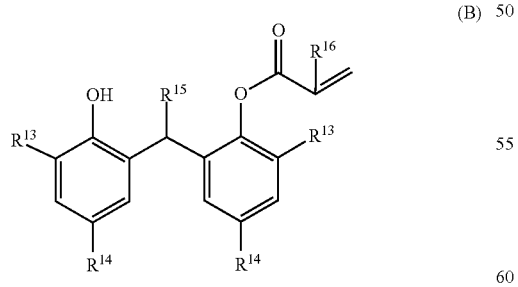

wherein $R^{13}$ and $R^{14}$ each independently represent an alkyl group having 1 to 8 carbon atoms, an aryl group having 6 to 12 carbon atoms, or an aralkyl group having 7 to 18 carbon atoms; $R^{15}$ represents a hydrogen atom, or an alkyl group having 1 to 3 carbon atoms; and $R^{16}$ represents a hydrogen atom or a methyl group.

Item 9. A method for manufacturing an exterior material for electrical storage devices, the method including the step of laminating a base material layer, a barrier layer and an inner layer in this order from the outside to the inner side to obtain a laminate, the inner layer containing a compound represented by the following general formula (A):

[Chemical Formula 15]

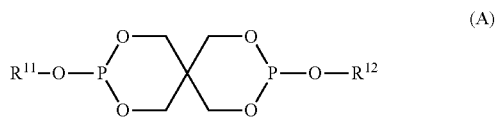

wherein $R^{11}$ and $R^{12}$ each independently represent an alkyl group having 1 to 18 carbon atoms, or a phenyl group optionally having a substituent.

Item 10. An electrical storage device in which an electrical storage device element including at least a positive electrode, a negative electrode and an electrolyte is stored in a packaging formed of the exterior material for electrical storage devices according to any one of items 1 to 5.

DESCRIPTION OF REFERENCE SIGNS

1: Base material layer
2: Adhesive agent layer
3: Barrier layer
4: Inner layer
41: Heat-sealable resin layer
42: Adhesive layer
6: Surface coating layer
10: Exterior material for electrical storage devices
11: Wire
12: Aluminum sheet

The invention claimed is:
1. An exterior material for electrical storage devices comprising a laminate including at least a base material layer, a barrier layer and an inner layer in this order from the outside, the inner layer containing a compound represented by the following general formula (A):

[Chemical Formula 1]

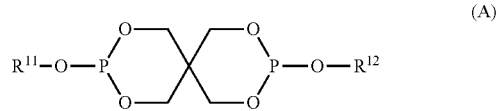

wherein $R^{11}$ and $R^{12}$ each independently represent an alkyl group having 1 to 18 carbon atoms, or a phenyl group optionally having a substituent.

[Chemical Formula 2]

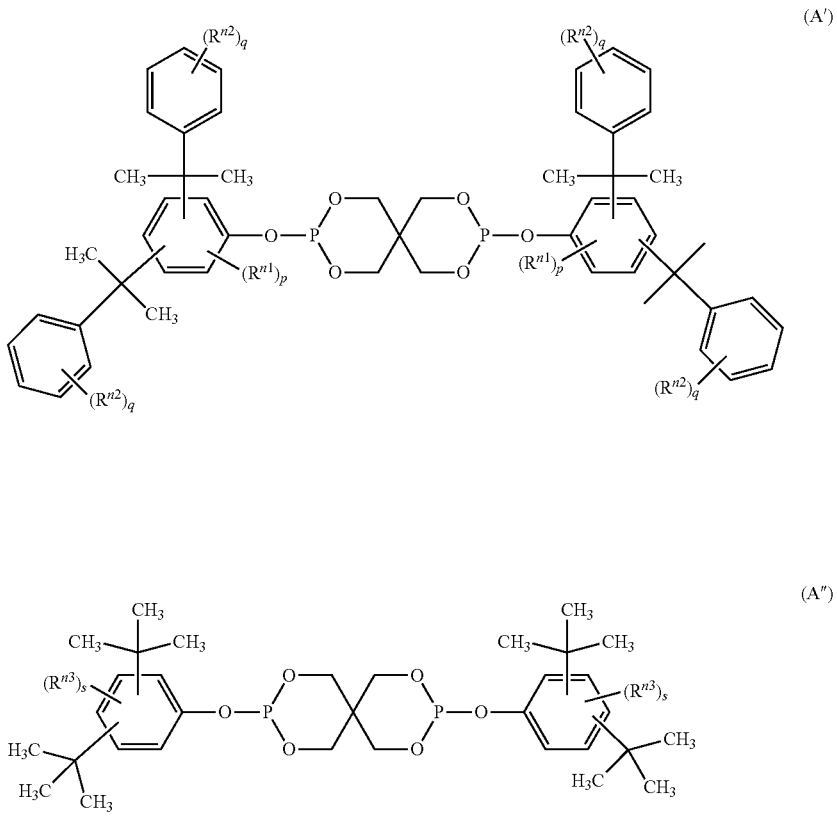

wherein in general formula (A'), $R^{n1}$ and $R^{n2}$ each independently represent a substituent other than a hydrogen atom, each p independently represents an integer of 0 to 3, and each q independently represents an integer of 0 to 5; and in general formula (A''), each $R^{n3}$ independently represents an alkyl group having 1 to 9 carbon atoms, and each s independently represents an integer of 0 to 3.

2. The exterior material for electrical storage devices according to claim 1, wherein in general formula (A), the phenyl group has, as a substituent, at least one group selected from the group consisting of an alkyl group having 1 to 9 carbon atoms, a cycloalkyl group having 5 to 8 carbon atoms, an alkylcycloalkyl group having 6 to 12 carbon atoms, and an aralkyl group having 7 to 12 carbon atoms.

3. The exterior material for electrical storage devices according to claim 1, wherein the compound represented by general formula (A) is at least one of a compound represented by the following formula (A') and a compound represented by the following formula (A''):

4. The exterior material for electrical storage devices according to claim 1, wherein the compound represented by general formula (A) is at least one of a compound represented by the following formula (A1) and a compound represented by the following formula (A2):

[Chemical Formula 3]

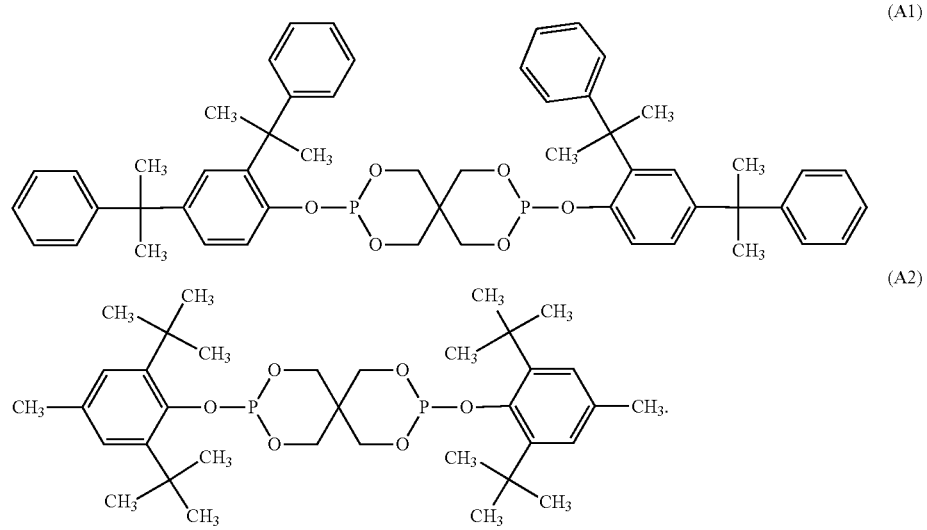

5. The exterior material for electrical storage devices according to claim 1, wherein the inner layer includes an adhesive layer and a heat-sealable resin layer in this order from the barrier layer side, and at least one of the adhesive layer and the heat-sealable resin layer contains a compound represented by general formula (A).

6. The exterior material for electrical storage devices according to claim 1, wherein the inner layer further contains at least one selected from the group consisting of the phosphorus-based antioxidant different from a compound represented by general formula (A), a phenol-based antioxidant, and a bifunctional processing stabilizer.

7. The exterior material for electrical storage devices according to claim 1, wherein the bifunctional processing stabilizer contains a compound having an acrylate group and a phenolic hydroxyl group in one molecule.

8. The exterior material for electrical storage devices according to claim 1, wherein the bifunctional processing stabilizer contains a compound represented by the following general formula (B):

[Chemical Formula 4]

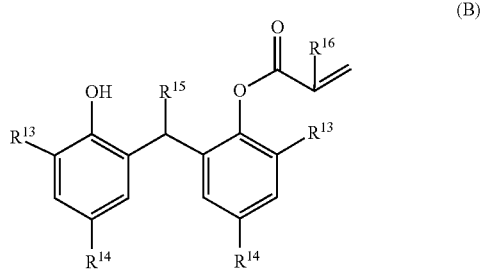

wherein $R^{13}$ and $R^{14}$ each independently represent an alkyl group having 1 to 8 carbon atoms, an aryl group having 6 to 12 carbon atoms, or an aralkyl group having 7 to 18 carbon atoms; $R^{15}$ represents a hydrogen atom, or an alkyl group having 1 to 3 carbon atoms;

and $R^{16}$ represents a hydrogen atom or a methyl group.

9. A method for manufacturing an exterior material for electrical storage devices, the method comprising the step of laminating a base material layer, a barrier layer and an inner layer in this order from the outside to the inner side to obtain a laminate, the inner layer containing a compound represented by the following general formula (A):

[Chemical Formula 5]

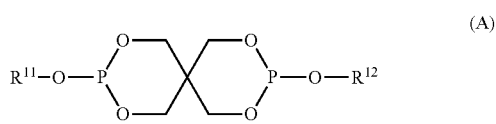

wherein $R^{11}$ and $R^{12}$ each independently represent an alkyl group having 1 to 18 carbon atoms, or a phenyl group optionally having a substituent.

10. An electrical storage device in which an electrical storage device element comprising at least a positive electrode, a negative electrode and an electrolyte is stored in a packaging formed of the exterior material for electrical storage devices according to claim 1.

* * * * *